US011877966B2

(12) United States Patent
Fugate et al.

(10) Patent No.: US 11,877,966 B2
(45) Date of Patent: Jan. 23, 2024

(54) PERSONAL HYGIENIC SHOWER, SYSTEM, AND METHOD OF USE

(71) Applicant: Onwai, LLC, Ogden, UT (US)

(72) Inventors: Jocilyn Oler Fugate, Ogden, UT (US); Trevor Fugate, Ogden, UT (US); Douglas Oler, Ogden, UT (US); David Fisher, Ogden, UT (US); Grant Protzman, Ogden, UT (US)

(73) Assignee: Onwai, LLC, Ogden, UT (US)

( * ) Notice: Subject to any disclaimer, the term of this patent is extended or adjusted under 35 U.S.C. 154(b) by 0 days.

(21) Appl. No.: 17/411,483

(22) Filed: Aug. 25, 2021

(65) Prior Publication Data

US 2023/0066615 A1 Mar. 2, 2023

(51) Int. Cl.
*A61G 7/00* (2006.01)

(52) U.S. Cl.
CPC .................................. *A61G 7/0005* (2013.01)

(58) Field of Classification Search
CPC . A47K 3/03; A47K 3/034; A47K 3/07; A47K 3/074; A47K 3/06; A47K 3/062; A47K 3/064; A61G 7/0005; E04H 4/103; E04H 4/0012; E04H 4/0025
See application file for complete search history.

(56) References Cited

U.S. PATENT DOCUMENTS 4,068,326 A 1/1978 Deschler
4,312,084 A 1/1982 Browning
4,982,462 A 1/1991 Wada
5,247,712 A 9/1993 Williams
5,341,526 A 8/1994 Kennedy
5,522,099 A 6/1996 Heier
6,052,844 A 4/2000 Walsh et al.
7,007,330 B2 3/2006 Kuiper et al.
(Continued)

FOREIGN PATENT DOCUMENTS

EP 509292 A1 * 10/1992 .......... A61G 7/0005
EP 3505028 A1 * 7/2019 .............. A47K 3/32
(Continued)

OTHER PUBLICATIONS

Machine translation of FR 2690335 retrieved Mar. 31, 2023 (Year: 2023).*
(Continued)

*Primary Examiner* — Janie M Loeppke
(74) *Attorney, Agent, or Firm* — Workman Nydegger

(57) ABSTRACT

A personal hygienic system is configured to be portable and to be placed under a patient on a bed or reclined surface. The personal hygienic system comprises an inflatable shower comprising an outer wall that defines an inner space and surrounds a patient. At least one washing fluid can be applied to the patient in the inner space. The outer wall comprises folds discretizing stacked wall segments. The inner space defines a slope declining from an upper end toward a bottom end and a drain portion arranged at the bottom end. The drain portion defines a recess, an aperture located in the recess, a raised bottom lip bounding the recess proximate the bottom end, and at least one drain channel arranged on a side of the drain portion and configured to collect spent washing fluid from one or more side segments and corresponding folds of the inner space.

19 Claims, 17 Drawing Sheets

(56) References Cited

U.S. PATENT DOCUMENTS

| | | | | |
|---|---|---|---|---|
| 8,402,582 | B2 * | 3/2013 | Xia | A47C 27/087 5/706 |
| 2004/0040083 | A1 * | 3/2004 | Bentley | A47K 3/06 4/585 |
| 2006/0282944 | A1 | 12/2006 | Sagi | |
| 2007/0028378 | A1 | 2/2007 | Hudson | |
| 2015/0067959 | A1 | 3/2015 | Kapp et al. | |

FOREIGN PATENT DOCUMENTS

| | | | | | |
|---|---|---|---|---|---|
| FR | 2690335 | A1 | * | 10/1993 | A61G 7/0005 |
| FR | 2904208 | A1 | * | 2/2008 | A61G 7/0005 |
| KR | 2011-0022808 | A | * | 3/2011 | A47K 3/001 |
| WO | WO-2011138660 | A1 | * | 11/2011 | A61G 7/0005 |

OTHER PUBLICATIONS

Braun V-Stol Bathing System, Radhika Seth, Sep. 22, 2009, Yanko Design, https://www.yankodesign.com/2009/09/22/braun-v-stol-bathing-system/; retrieved on Dec. 6, 2021.

Bezerra, Karolina et al., “A New Methodology for Use by a Single Caregiver to Bathe Bedridden Elderly Persons Using Advanced Mechatronic Systems,” Healthcare 2019, 7(4), 124; Published Oct. 28, 2019; https://doi.org/10.3390/healthcare7040124.

* cited by examiner

PERSONAL HYGIENIC SHOWER, SYSTEM, AND METHOD OF USE

TECHNICAL FIELD

The disclosure relates to a personal hygienic shower, system, and method of use of the same.

BACKGROUND

Hospitalized, disabled, and other bedridden or non-ambulatory individuals such as long-term care patients often suffer from a difficulty in bathing or washing due to the difficulty of getting out of bed, walking to the bathroom, standing in a shower or getting safely into a bathtub, bathing, safely exiting the shower or bathtub, drying off, and getting back into bed safely. Such individuals may struggle with any one or more of the above steps due to lack of physical or mental dexterity or stamina, shortage of hospital or nursing staff that are available to supervise and/or assist with the above steps, a shortage of available hygiene facilities, or otherwise. Resources and manpower in hospitals, care facilities, and in-home nursing services are often badly stretched and as a result patients often do not get enough bathing, negatively impacting their health and comfort.

Attempts have been made to provide in-bed washing facilities or systems, such as hospital beds that comprise an integrated inflatable bath and shower system with an integrated hose, nozzle, and drain, but existing efforts to provide a personal hygienic bath and system for non-ambulatory individuals have the disadvantage of poor drainage, complexity of constructions, and difficulty of sliding and positioning the bath component of the hygienic system underneath the patient. This has the disadvantage that such existing in-bed hygienic systems must be integrated into the hospital bed, increasing the cost of the bed and reducing the flexibility of use.

In-bed washing systems that can be slid or positioned underneath a patient without being integrated into the bed also have the disadvantage of being difficult or unwieldy to slide underneath a patient without disturbing the patient. Such systems may also be cumbersome to lift, position, and store between uses. Some efforts have been made to make such systems collapsible and/or inflatable.

However, existing solutions often have insufficient drainage due to the difficulty of incorporating an effective drain into a collapsible and inflatable bath, as the operation of the folds and structures of the inflatable bath have been found to interfere with the operation of the drain, and/or to interfere with the ability of the bath to properly inflate. Improper or incomplete drainage of water from an inflatable bath leads to numerous problems, such as microbial growth (e.g., mildew or bacterial biofilms) on the surface of the inflatable bath when it is subsequently collapsed and stored for later use, contamination of bathing water used with a subsequent patient, and/or splashing or spilling on the bed and/or floor when the inflatable bath is being used, collapsed, and/or removed. This can create hazardous conditions that may lead to slipping, falling, and injury. Improper or incomplete drainage of water from the inflatable bath further limits the duration and quality of a bath, as spent water pooling in the drainage area is liable to overflow the inflatable bath and may pool around the patient's legs and body. This also leads to poor cleaning.

Improper inflation or deflation of an inflatable bath can also lead to discomfort for a patient due to uneven inflation, uneven or incomplete drainage due to the folds not expanding to allow water flow therethrough, and difficulty in deflating the inflatable bath after use so as to remove the bath from the patient.

In view of the foregoing, there is a need for a personal hygienic shower and system that addresses the problems of the art, such as the difficulty of providing a personal hygienic shower and system that provides both sufficient drainage as well as collapsibility/inflatability while being configured for placing under a patient. There is further a need for a personal hygienic shower and system that can be portable such that the system need not be integrated with a hospital or other bed.

SUMMARY

Personal hygienic shower, system, and method embodiments of the present disclosure advantageously address the known problems of existing hygienic systems including inflatable baths. The embodiments comprise a shower configured for being provided under a patient to be showered, along with a reservoir of washing fluid, and at least one pressure-altering means. The shower can be a collapsible and/or inflatable shower configured to be portable so as to be placed or slid underneath a patient lying on a bed in a collapsed configuration and then raised to the inflated configuration to define the shower, allowing the patient to be showered without the steps of getting out of bed and into a separate shower or bath.

The at least one pressure-altering means can provide positive pressure to draw clean washing fluid from the reservoir for use in showering the patient and/or produce suction configured to pull spent washing fluid away from the shower via the drain. The system may comprise at least one valve configured to control the positive pressure that provides washing fluid to the shower and/or to control the suction that removes the washing fluid. In some embodiments, the valve is a venturi valve that simultaneously facilitates providing positive pressure for washing and suction for draining. For example, the venturi valve allows a user to provide a positive pressure washing fluid source as described herein, with the positive pressure from the washing fluid providing the suction to remove spent washing fluid from the shower through the venturi valve. The system may be configured to be entirely portable such that the system need not be integrated with a hospital or other bed but rather may be brought to a patient when needed, thereby reducing the costs of providing in-bed hygiene systems and complexity of operating the system.

The shower of the personal hygienic system according to embodiments may be collapsible and/or inflatable such that the basin may include a body defining an internal chamber configured to receive a pressurizing fluid, such as compressed air or other suitable fluid. The body may include an outer wall circumscribing a washing space wherein washing fluid can pool for washing the patient. The outer wall and/or the washing space may include one or more segments discretized at least partially by folds.

The arrangement of the folds and the segments may allow the shower to collapse between uses into a compact or collapsed form and/or to be conveniently placed under a patient in preparation for use, without interfering with the ability of the shower to effectively drain washing fluid away from the patient. In particular, the shower may be employed using the same maneuvers that healthcare professionals already use to change sheets, such that no additional training is needed for clinicians to properly use the shower on a patient.

The shower in some embodiments may define a slope such that washing fluid pools to a single drainage or drain portion of the basin. The drain portion may include a drain aperture extending at least partially through a thickness of the shower and facilitating removal of spent washing fluid under the suction provided by the venturi valve. The inflatable walls of the shower may additionally, or alternatively, define a head portion and/or a body portion configured in size and shape to accommodate a patient on a bed as efficiently as possible. For example, a widest portion of the shower may be proximate the patient's shoulders, with narrower portions proximate the patient's head and feet.

The shower may be long and wide enough to accommodate a particular size of patient, and/or may be provided in predetermined sizes, e.g., child, adult, wide, tall, or any other suitable dimension. Due to the collapsibility of the shower, storing a plurality of sizes of showers does not burden a hospital or care facility, yet the shower also provides increased flexibility of use of the personal hygienic system and allows a user to take care not to place a shower that is too large or too small for a particular patient on a bed.

BRIEF DESCRIPTION OF THE DRAWINGS

These and other features, aspects, and advantages of the present disclosure will become better understood regarding the following description, appended claims, and accompanying drawings.

DETAILED DESCRIPTION

Overview

Figure 1A:
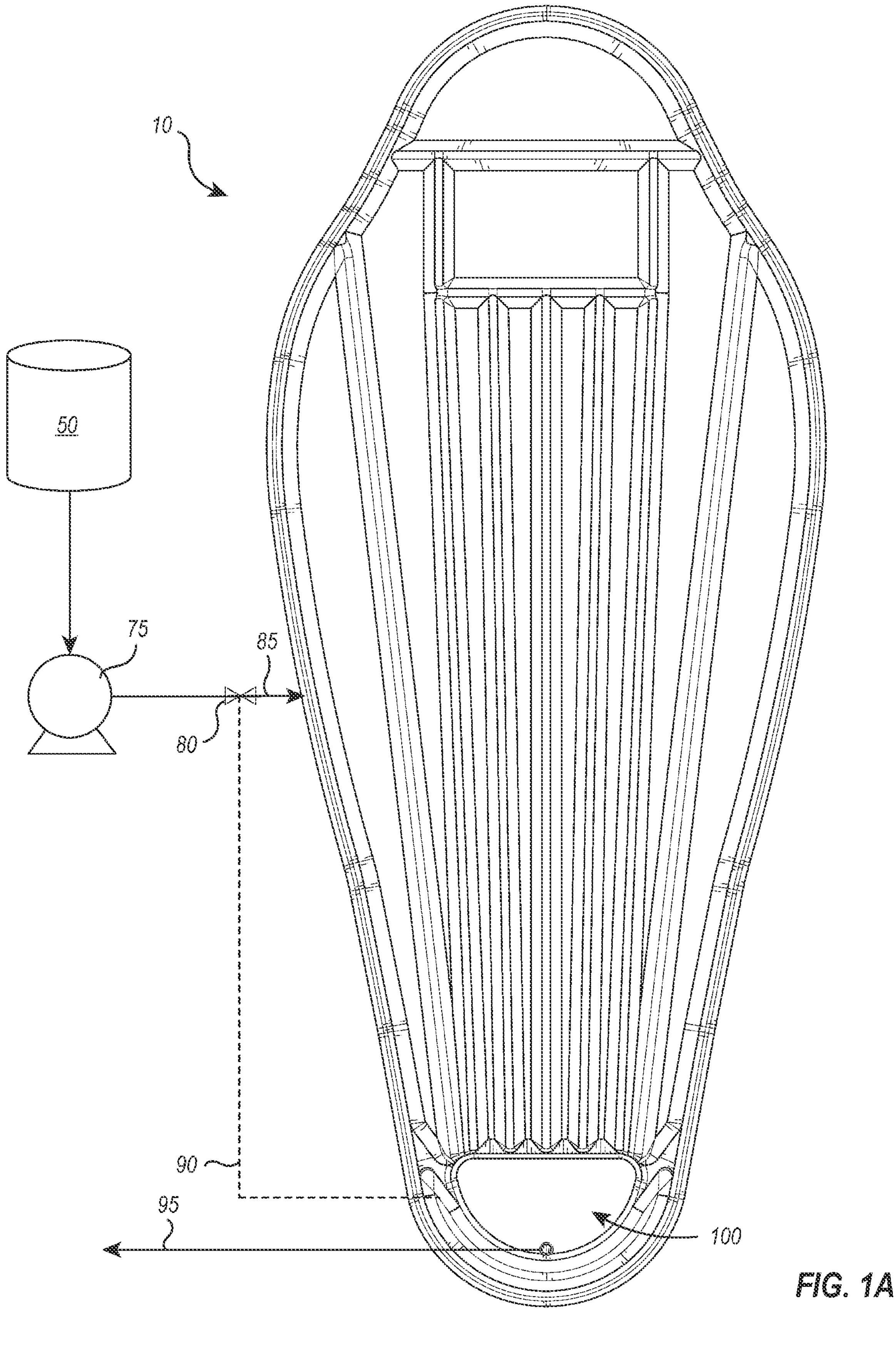
FIG. 1A is a schematic plan view of a personal hygienic system according to an embodiment of the disclosure.

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning.

Various Embodiments and Components for Use Therewith

Personal hygienic showers, systems, and components for use therewith, and methods for using the same, are described herein. While the personal hygienic shower and system is described within the context of a preferred embodiment directed to showering a person, many features described herein may be extended to other uses, including showering animals, washing objects, non-cleaning-related collapsible and/or inflatable items, or otherwise. It should be appreciated that the personal hygienic shower and system can be adapted to accommodate different materials, configurations, shapes, and functions. It should also be appreciated that the personal hygienic shower and system can be adapted for washing, recreation (such as blow-up yard toys, camping gear, air mattresses, or otherwise), or other purposes.

FIG. 1A shows a personal hygienic system 10 according to an embodiment of the disclosure. The personal hygienic system 10 may include a shower 100, at least one pressure-altering means 75, such as a pump or a compressor, and a reservoir 50. The reservoir 50 may be configured to hold a washing fluid for use with the personal hygienic system 10, such as water. Alternatively, the system 10 may be configured to be releasably connected to and be supplied by a plumbing unit, such as a potable water outlet within a hospital, care facility, or home. The reservoir 50 may be configured to hold any suitable volume of fluid, such as between 5 and 100 gallons or any other suitable volume. The reservoir 50 may have a heat-exchange modality, such as a heating element, to raise the temperature of the fluid in the reservoir 50 for a patient's comfort and improved hygiene. Any suitable heat-exchange modality may be used. The heating element may be electric or may be fuel-based. For example, a refrigerating unit for lowering the temperature of the fluid in the reservoir 50 for a patient's comfort may also or alternatively be included. Not shown is a power source or connection to a power source that may be utilized to operate the heat-exchange modality.

In embodiments, the pressure-altering means 75 may be configured to compress a filling medium to inflate the shower 100 through an inflation valve after the shower 100 has been arranged underneath a patient in a collapsed configuration. Where the filling medium is a gas such as air, the pressure-altering means 75 may be a compressor (not shown) distinct from the pressure-altering means 75 for the washing fluid. The pressure-altering means 75 may be attached in any suitable matter to the shower 100 and the system 10 and may be operable by the user, i.e., the clinician or caretaker.

In embodiments where the filling medium is a liquid such as water, the pressure-altering means 75 may be a pump that can also serve to provide the washing fluid from the reservoir 50 to the shower 100, or may be a distinct pump configured only for providing the filling medium through the inflation valve. The inflation valve may be configured to be opened after use to allow the filling medium to escape from the shower 100 easily and without added work from the pressure-altering means 75. In embodiments, the pressure-altering means 75 and the inflation valve may be configured to quickly deflate the shower by applying a vacuum to withdraw the fluid. The reservoir 50 may be configured to contain both the filling medium (such as water or compressed gas) and a washing fluid.

In embodiments, distinct pressure-altering means 75 may be provided to both inflate the shower 100 from a deflated state to an inflated state, and to deliver the washing fluid from the reservoir 50 to the shower 100, and/or away from the shower 100 after being used to shower a patient.

The pressure-altering means 75 may connect to the shower 100 by a supply line 85 and/or a waste line 95. The waste line 95 may extend from the shower 100 proximate a drain aperture, as will be described in greater detail herein. The supply line and/or the waste line 85, 95 may connect to the pressure-altering means 75 through a valve 80. The valve 80 may be a venturi valve configured to provide positive pressure to the shower 100 through the supply line 85 and simultaneously to remove the spent washing fluid from the shower 100 through the line 95 by providing suction through line 90.

The waste line 95 may be configured to be releasably connected to a plumbing unit, such as a spent water or sewage line, in a hospital, care facility, or home. Alternatively, the waste line 95 may be configured to feed to a waste reservoir (not shown). The waste line 95 may be delivered to a discrete waste portion of the reservoir 50 which may be distinct from a fresh fluid portion of the reservoir 50, such as defining different compartments within the reservoir 50. In embodiments, a separate line and valve may be configured to recycle at least a portion of the washing fluid for continued use on the patient, either to the reservoir 50 or directly to the shower 100 via the hose.

The system 10 may further include at least one fluid-dispensing unit, such as a hose and an attached nozzle, faucet, or shower head, allowing a caretaker or clinician to wash the patient using the supplied washing fluid. In embodiments, the nozzle may be configured to produce a low spray. The fluid-dispensing unit may include any suitable nozzle, faucet, or head, such as a flat fan nozzle, a hollow cone nozzle, a full cone nozzle, a misting nozzle, a solid stream nozzle, modifications thereof, or any other suitable fluid-dispensing modality. In other embodiments, the fluid-dispensing unit may include a shower head with multiple spray modes between which a user may switch when showering a patient. Multiple fluid-dispensing units may be provided in embodiments such that multiple users or caretakers can simultaneously help shower a patient, accelerating the showering process. The system 10 may be configured in embodiments to be fully portable so as to be conveniently brought to and used on a particular patient without having to be integrated with the patient's hospital or other bed.

The system 10 may include a control unit (not shown) configured to control the operation of the pressure-altering means 75 and/or the valve 80. In embodiments, the control unit may adjust the operation of the pressure-altering means 75 according to an input from at least one sensor. The sensor may be positioned between the reservoir and the pressure-altering means, between the pressure-altering means and the valve, between the valve and the shower, combinations of the above, or at any other suitable locations. The at least one sensor may be a flowmeter such as a rotameter, piston-type flowmeter, thermal-type mass flowmeter, ultrasonic doppler flowmeter, turbine meter, paddlewheel sensor, positive displacement flowmeter, vortex meter, pitot tube, magnetic flow meter, anemometer, or any other suitable flowmeter. The at least one sensor may be a pressure sensor integrated with the venturi valve 80. Alternatively, the pressure sensor may be a pressure transducer, a pressure sensor, or a pressure transmitter. Any suitable sensor or combinations of sensors may be used.

Figure 1B:
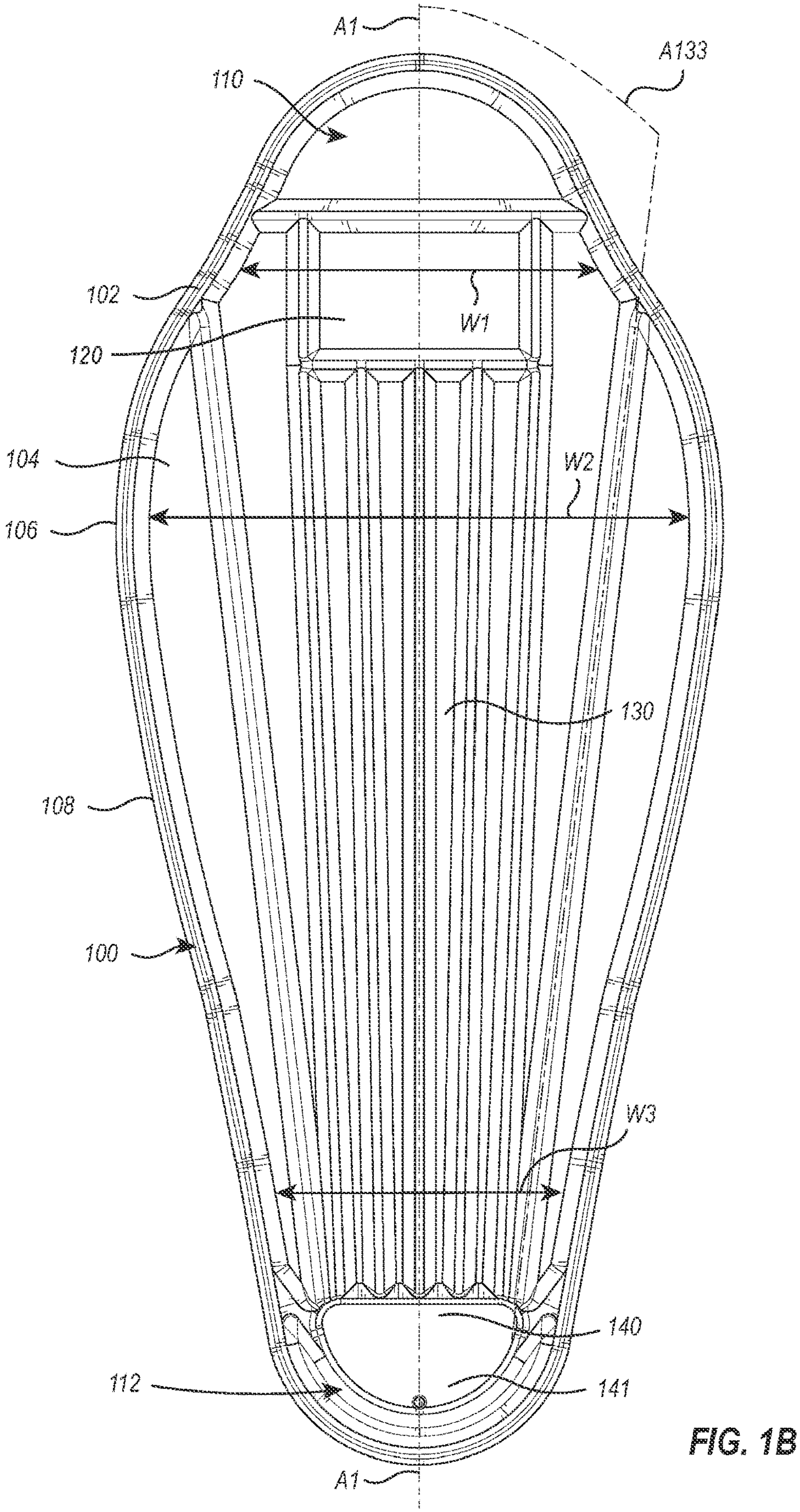
FIG. 1B is a top plan view of a shower for use in the personal hygienic system of FIG. 1A.

Turning to FIG. 1B, the shower 100 may extend generally along a longitudinal axis A1 from an upper end 110 to a bottom end 112. The shower 100 may include an outer wall 102 circumscribing and defining an inner space 104 to form a shower configured to hold a quantity of fluid for washing a patient therein. The outer wall 102 may define a profile 108 between the upper and lower ends 110, 112, and may define a widest point 106 therebetween. The widest point 106 corresponding to a width W2 may be arranged proximate a region of the shower 100 proximate to where a patient's shoulders may be situated during use. A narrower width W1 may correspond to a region of the shower 100 proximate to where a patient's head may be situated during use, and a still narrower width W3 may correspond to a region where the patient's feet may be situated during use.

By providing the different widths W1, W2, W3, the shower 100 may have a reduced overall surface area, which reduces the costs of manufacturing and the difficulty of using the system 10 with different sizes of beds, for example hospital beds. In embodiments, the shower 100 may define a rectangular, circular, ovoid, or other shape, and may have straight, bent, arcuate, or other shaped edges in any suitable combination or configuration.

While the depicted embodiment shows an asymmetrical shape between the upper and lower ends 110, 112, it will be appreciated that any suitable configuration of the shower 100 may be used, including a substantially symmetrical configuration between the upper and lower ends 110, 112. Any suitable width at any suitable location along the shower 100 may be used.

The shower 100 may be configured to be collapsible and/or inflatable, whereby an inner cavity defined by a material of the shower 100 may be sealed to the exterior atmosphere and may be filled with a filling medium such as air or any other suitable material, such as water, in order to pressurize and inflate the shower 100 to a desired shape and pressure. A valve may be provided at any suitable location for releasing the medium when the shower 100 is not in use and for providing the medium when the shower 100 is in use.

In embodiments, the shower 100 may not define a distinct inner cavity configured for receiving a filling medium, but rather may include a solid body defined by a suitable material. In embodiments, the solid body may be formed from a coated foam material, such as a closed-cell polyurethane foam of any suitable density, an open-cell polyurethane foam of any suitable density, an ethyl-vinyl acetate (EVA) foam of any suitable density, a polyester foam of any suitable density, a synthetic or natural latex foam of any suitable density, combinations thereof, or any other suitable material.

One portion of the shower 100, such as the region proximate the head, may be formed of a material or blend of materials, while a portion proximate the feet may be formed of a different material or blend of materials, for example. In embodiments, a portion of the shower is solid comprising suitable material while an inner cavity configured to receive a filling medium is formed in a different portion. The coating may be a vinyl material or any other suitable material. In embodiments, the shower 100 having a solid body may be configured to be flexible, collapsible, and/or inflatable for ease and convenience of placing under a patient before use and removing from the patient after use.

The shower 100 may be formed of a polymeric material, such as a polyvinyl chloride, polyurethane, synthetic rubber such as silicone rubber, or any other suitable polymeric material such as thermoplastic elastomers, a textile-reinforced material, combinations thereof, or any other suitable material. An entirety of the shower 100 may be formed from a single unitary piece of material, or individual sections of the shower 100 may be formed separately of different materials having desired properties and then adhered to each other during manufacturing. In embodiments, a substantial entirety of the shower 100 may be formed from a thermoplastic urethane (TPU) coated nylon material. The nylon material may be a nylon twill. Any suitable modality for providing the filling medium may be used. In embodiments, a compressor may compress air and provide the compressed air at the valve to inflate the shower 100 from a collapsed configuration to an inflated or full configuration. As described above, the compressor may be the pressure-altering means 75, or may be a different component of the system 10 altogether.

Figure 2:
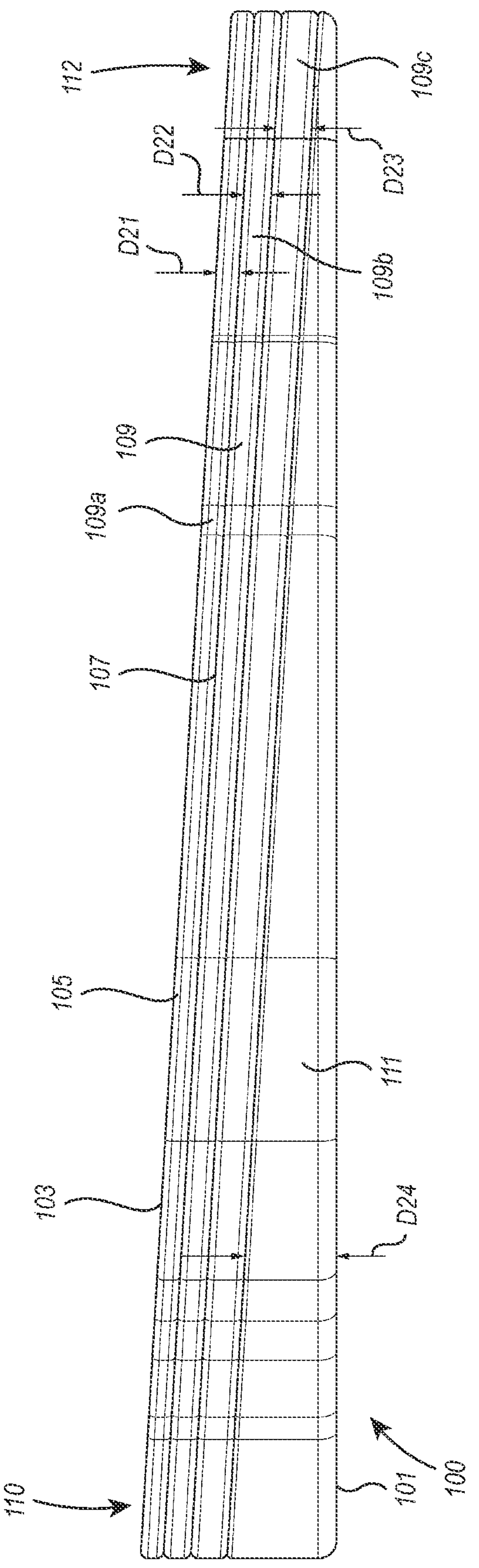
FIG. 2 is an elevational side view of the shower of the embodiment of FIG. 1B.

Within the inner space 104 circumscribed by the outer wall 102, a head portion 120, a main body portion 130, and a foot or drain portion 140 may be arranged in order from the upper end 110 toward the bottom end 112. As seen in FIG. 2, the shower 100 may define a slope 105 extending and declining from the upper end 110 toward the bottom end 112, with the washing fluid thereby pooling and draining away from the patient's head and toward the patient's feet.

The outer wall 102 may extend to and define a topmost surface 103 of the shower 100. The topmost surface of the outer wall 102 may define and/or follow the slope 105 parallel with a surface of the inner space 104 as will be described in greater detail herein. By contrast a bottom surface 101 of the shower 100 may be substantially planar or flat so as to be laid upon or flush against a bed or other flat surface. In embodiments, the bottom surface 101 may be shaped to conform to any suitable surface, such as a bed or chair that is in a reclined or partially reclined position or any other position or shape.

The outer wall 102 may be configured to be collapsible and/or inflatable such that a total height of the shower 100 may be reduced between uses and/or when the shower 100 is placed under a patient on a bed. For example, a clinician or caretaker may more easily slide or position the shower 100 under the patient's body when the shower 100 is in a collapsed configuration or state. To this end the outer wall 102 may include one or more wall segments 109 discretized by one or more corresponding and coextensive folds 107.

The folds 107 may extend a distance into a thickness of the outer wall 102 with the wall segments 109 expanding outwardly beyond the folds 107 to define a substantially flat outer surface of the shower 100. When the shower 100 is deflated of the filling medium, such as between uses, the wall segments 109 may deflate and collapse along the folds 107 to form a compact or collapsed configuration. This may occur, for example, when the valve of the shower 100 is opened to release the filling medium. In embodiments, the folds 107 may extend parallel with the slope 105 as shown in FIG. 2, but in other embodiments the folds 107 may extend in any other suitable configuration, which may be asymmetric and need not be coextensive along the length of the shower. While three segments 109 are depicted, it will be appreciated that more or fewer segments 109 may be provided, if at all, as part of the outer wall 102.

The wall segments 109 may be uniform in dimensions or may define different heights and/or thicknesses. As seen in FIG. 2, a topmost wall segment **109*a* may have a height D21 defined between the top surface 103 and an adjacent fold 107, while a second wall segment 109*b* underneath the topmost wall segment 109*a* may have a greater height D22 defined between adjacent folds 107 than the height D21. A third wall segment 109*c* underneath the second wall segment 109*b* may define a still greater thickness D23. The depicted embodiment may advantageously facilitate greater structural stability near a base or bottom of the outer wall 102 relative to a top of the outer wall 102. While the arrangement of the heights D21, D22, D23** is shown and described, it will be appreciated that any suitable configuration may be adopted.

For example, the folds 107 may extend from the upper end 110 toward the bottom end 112 in such a way as to reduce the heights D21, D22, D23 in certain areas relative to other areas and may vary along a total length of the shower 100. This may facilitate, for example, a more-flexible section of the outer wall 102 relative to other sections, such as may allow the shower 100 to be more easily slipped under and around a patient while the patient remains laying or reclining in bed. In embodiments, the folds 107 may extend in such a way as to create a more-flexible section of the outer wall 102 proximate the patient's midsection.

The segments 109 may extend upwardly from a main body portion 111 which may not include folds through a thickness thereof, and which may extend continuously with and into the inner space 104. A height D24 of the main body portion 111 defined between the bottommost fold 107 and the bottom surface 101 of the shower 100 may be greater than the heights D21, D22, D23 of the wall segments **109*a*, 109*b*, 109*c*. Whereas the heights D21, D22, D23 of the wall segments 109*a*, 109*b*, 109*c* may be substantially uniform along a length of the shower 100, the height D24 of the main body portion 111 increases toward the upper end 110 of the shower 100 from a smallest height proximate the lower end 112**.

The heights D21, D22, D23 of the wall segments **109*a*, 109*b*, 109*c* may be configured such that together the heights D21, D22, D23 define a sufficiently deep basin circumscribed by the outer wall 102 for showering a patient. That is, the heights D21, D22, D23 may be sufficient to extend above an average thickness of a patient laying in the inner space 104 such that at least part of the patient may be immersed in the washing fluid if desired, and to conveniently contain the washing fluid without spilling over the outer wall 102**.

The height D24 of the main body portion 111 may be configured to provide sufficient support for the patient while retaining the ability of the shower 100 to be switched to a collapsed configuration for placing under the patient prior to use. That is, the volume of the main body chamber 160 within the main body portion 111 may advantageously be configured to comfortably support the patient's weight based on the pressure and properties of the filling medium along the longitudinal length of the shower 100.

Figure 3:
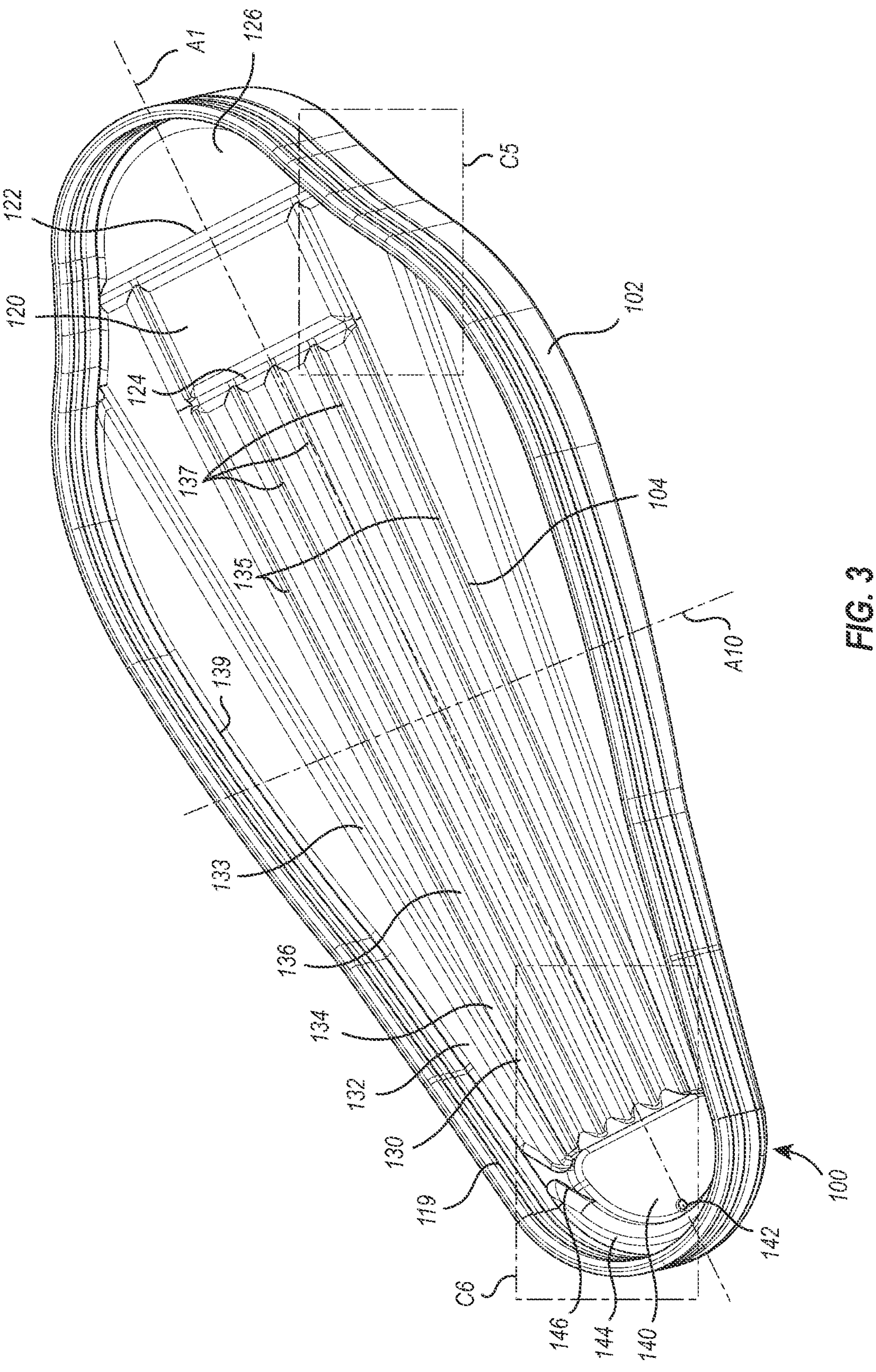
FIG. 3 is a perspective view of the shower of the embodiment of FIG. 1B.

Turning to FIG. 3, the inner space 104 of the shower 100 may include the head portion 120, body portion 130, and drain portion 140 arranged respectively between the upper and lower ends 110, 112. The head portion 120 may be or define a section of a top surface 114 (FIGS. 7 and 10) of the inner space 104 and may be discretized by one or more folds, such as a transverse head-portion top fold 122 and a transverse head-portion bottom fold 124. Each of the top and bottom folds 122, 124 may be connected to one or more inner longitudinal folds 135 leading along the slope 105 toward the drain portion 140, thereby leading moisture away from the patient's head and defining a comfortable and easy-to-find head portion of the shower 100. The folds 122, 124, 135 may serve both to drain washing fluid away from the patient's head, allowing for more complete and efficient cleaning of the patient's head and hair, and also may serve as useful indicia for a caretaker or clinician when positioning the shower 100 underneath the patient prior to use.

The body portion 130 may include one or more body segments 132, 134, 136 discretized by one or more longitudinal folds 133, 135, 137. The one or more longitudinal folds 133, 135, 137 may serve to discretize individual body segments 132, 134, 136 from each other and define flow channels extending directly to the drain portion 140 and configured to facilitate the flow of washing fluid toward the drain portion 140 and/or to help the shower 100 collapse to a desired collapsed configuration between uses or facilitate easier placement of the shower 100 under a patient.

One or more side segments 132 are configured on an outermost portion of the inner space 104 and abut and/or connect to the outer wall 102. The side segments 132 follow on an outer edge thereof the profile 108 defined by the outer wall 102 between the upper and lower ends 110, 112, and in embodiments between the drain portion 140 and the head portion 120, thereby facilitating the drainage of washing fluid from the head portion 120 toward the drain portion 140 due to the slope 105 of the shower 100. The inner edge of the side segments 132 abuts an outer longitudinal fold 133 extending between the upper and lower ends 110, 112. The outer longitudinal fold 133 extends in a straight configuration or pattern.

Next to the side segments 132 are arranged one or more outer body segments 134 likewise extending generally longitudinally. The side segments 132 and the outer body segments 134 are shown having generally straight edges, but it will be appreciated that any shape or configuration of the segments 132, 134 may be used as suitable. The outer body segments 134 may extend in embodiments toward the upper end 110 so as to abut the head portion 120 at sides thereof. Opposite the outer longitudinal folds 133 may be arranged one or more inner longitudinal folds 135 discretizing the outer body segments 134 from one or more central body segments 136. The segments 132, 134, 136 may narrow in width as they approach the bottom end 112 so as to conform to and cooperate with a profile and shape defined by the outer wall 102.

In the depicted embodiment, there may be four central body segments 136 bounded by three inner longitudinal folds 137, each of which may extend substantially parallel with the longitudinal axis A1 and extend from the drain portion 140 to the head portion 120. Likewise, the outer longitudinal folds 133 may be substantially parallel with the longitudinal axis and may extend from the drain portion 140 to the head portion 120. In embodiments, the body segments may be discretized by any suitable number and pattern of transverse folds (not shown). Transverse folds may extend generally parallel with a transverse axis A10. In other embodiments, the folds 133, 135, 137 may be generally altogether omitted.

In embodiments, the outer longitudinal folds 133 may extend at an angle A133 relative to the axis A1 and may extend from the drain portion 140 to beyond the bottom fold 124 of the head portion 120. In embodiments, the outer longitudinal folds 133 may extend to the outer wall 102 and abut or join with an outermost fold 139 as described herein.

The inner longitudinal folds 135, and the outer longitudinal folds 133, may have a depth relative to a plane defining the top surface 114 sufficient for both collapsing the shower 100 to a desired configuration and for accommodating the volume and other properties of the washing fluid as the fluid drains along the folds from the upper end 110 toward the bottom end 112. The depth of the inner and outer longitudinal folds 135, 133 may be a same depth or may vary between the inner and outer longitudinal folds 135, 133, or between each fold as suitable.

The central body segments 136 may likewise extend substantially longitudinally from the drain portion 140 toward the head portion 120 and may contact the bottom fold 124 of the head portion 120. Washing fluid may thereby be allowed to flow from the upper end 110 and the head portion 120 toward the drain portion 140 partially through the folds 133, 135, 137 without being trapped between the patient's body and one or more of the segments 132, 134, 136.

The body portion 130, including the segments 132, 134, 136, may have a sufficient length such that most patients (with all manner of different physical dimensions) for whom the shower 100 may be used may comfortably rest their heads proximate the head portion 120 with enough room for the patients' body and feet to rest within the inner space 104 upon the body portion 130.

Outwardly of the side segments 132 may be outermost folds 139. The outermost folds 139 may discretize the side segments 132 from the outer wall 102. The outermost folds 139 may extend a same or different depth and/or a same or different length compared to the folds 133, 135, 137. As shown in the depicted embodiment, the outermost folds 139 may extend about the outer surface of side segments 132 abutting the outer wall 102 and adhering generally to the profile 108 defined by the outer wall 102, thereby defining a greater length than the folds 133, 135, 137.

The depth of the outermost folds 139 in the depicted embodiment is shown as being greater than the depth of the folds 133, 135, 137, and may cooperate with the drain channels 146 to deliver spent washing fluid to the drain portion 140 due to the greater volume of water captured in and transported through the outermost folds 139. The folds 133, 135, 137, 139 may also define a width between the top surfaces of adjacent segments. The width defined by the folds 133, 135, 137, 139 may be a same width or may vary based on location along the shower 100. For example, the width defined by the outermost folds 139 may be less than a width defined by the central longitudinal folds 137. The width may be uniform along a length of the fold or may vary about the length.

A top section 126 may be arranged above (that is, closer to the upper end 110) the head portion 120, and may define an outer edge corresponding to the profile 108 of the outer wall 102. The top section 126 may be bounded on a bottom edge by the top fold 122 of the head portion 120.

As seen from FIG. 3, inner folds 119 may be defined in an inner surface of the outer wall 102. In embodiments, the inner folds 119 may correspond to and be located at a same height and configuration as each of the folds 107 defined in an outer surface of the outer wall 102. In other embodiments, the inner folds 119 may vary in number, depth, and configuration relative to the outer folds 107.

While the folds 107, 119, 133, 135, 137, 139 of the outer wall 102 and the inner space 104, respectively, have been shown and described as defining a recess or detent in a corresponding surface of the shower 100, it will nevertheless be understood that the folds may alternatively or in combination include an extension portion as opposed to a recess. For example, the folds may include a folding component or elastic component extending outwardly above the corresponding surface of the shower 100. In embodiments, a combination of recesses and extension portions may be formed at locations about the shower 100. The extension portion may allow for collapsibility and/or inflatability of the shower 100 and/or may facilitate flow of washing fluid toward the drain portion.

The drain portion 140 may be configured to collect the washing fluid from a remainder of the shower 100 and to guide the washing fluid toward an aperture 142 defined in a recess 141 from and through which the washing fluid may be removed from the shower 100. The drain portion 140 may define the recess 141 and may further include a bottom lip 144 configured to abut the outer wall 102 at the bottom end 112. The bottom lip 144 is substantially aligned with the slope 105. In embodiments such as the embodiment of FIG. 3, in which the outer wall 102 defines an arcuate profile at the bottom end 112, the bottom lip 144 may likewise define an arcuate profile. It will be appreciated that the outer wall 102 may define any suitable shape or configuration. The top surface 114 terminates at a substantially transverse and substantially straight proximal edge 143 (FIG. 6) of the recess 141. The straight proximal edge 143 and the bottom lip 144 define a substantially semi-circular configuration of the recess 141.

The drain portion 140 may further define one or more drain channels 146. The drain channels 146, as seen in the embodiment of FIG. 3, may be arranged on either side of the shower 100 and may serve to allow the spent washing fluid to pool from, for example, the side segments 132 more effectively, particularly where only a single fold 133, which in embodiments may be deep and/or fast-flowing to facilitate complete drainage of spent washing fluid, abuts the side segments 132. The drain channels 146 may be arranged symmetrically on opposed sides of the shower 100 or in any other suitable configuration. In embodiments, the drain channels 146 may be arranged at regular intervals about a perimeter of the recess 141. While two drain channels 146 are shown, fewer or more may be provided as suitable.

Figure 6:
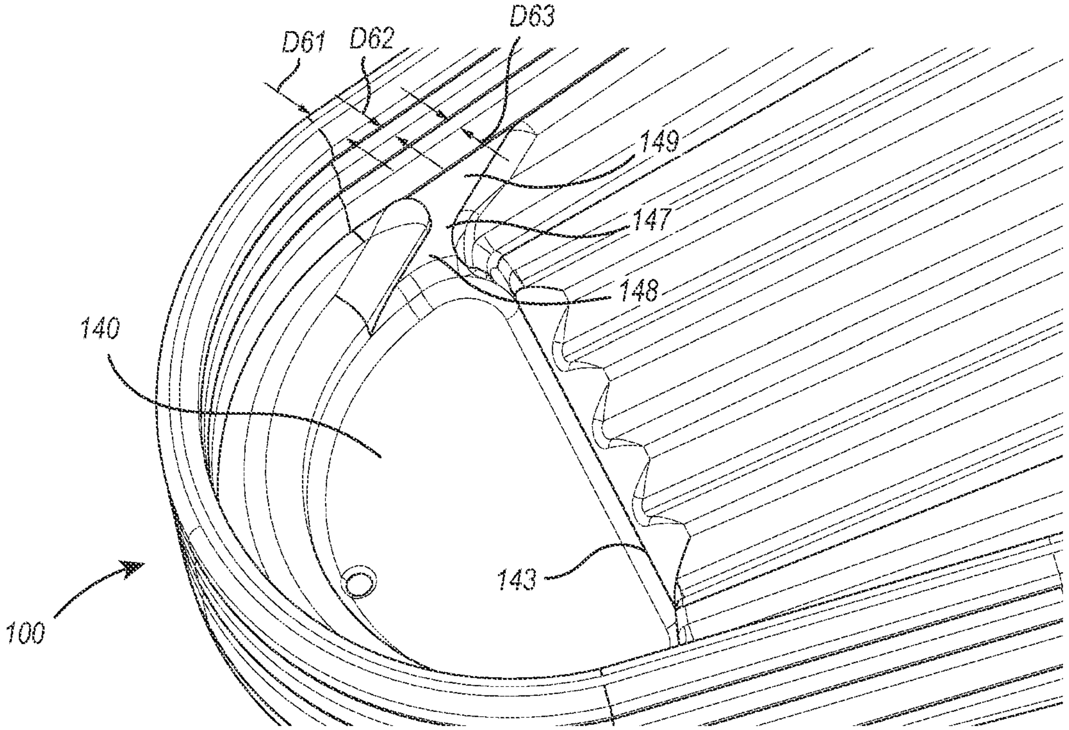
FIG. 6 is a close-up view of the section C6 of FIG. 3.

The drain channels 146, as seen in FIG. 6, may include one or more widened portions 148, 149 flanking a neck portion 147, the widened portions 148, 149 and the neck portion 147 defined by the bottom lip 144 and one or more of the body segments. The drain channels 146 may extend below the top surface 114 of the inner space 104 but above a bottom surface of the recess 141, allowing spent washing fluid to flow from the top surface 114 into the recess more efficiently and at a higher velocity due to the bottlenecking effected by the neck portion 147 and widened portions 148, 149.

Figure 4:
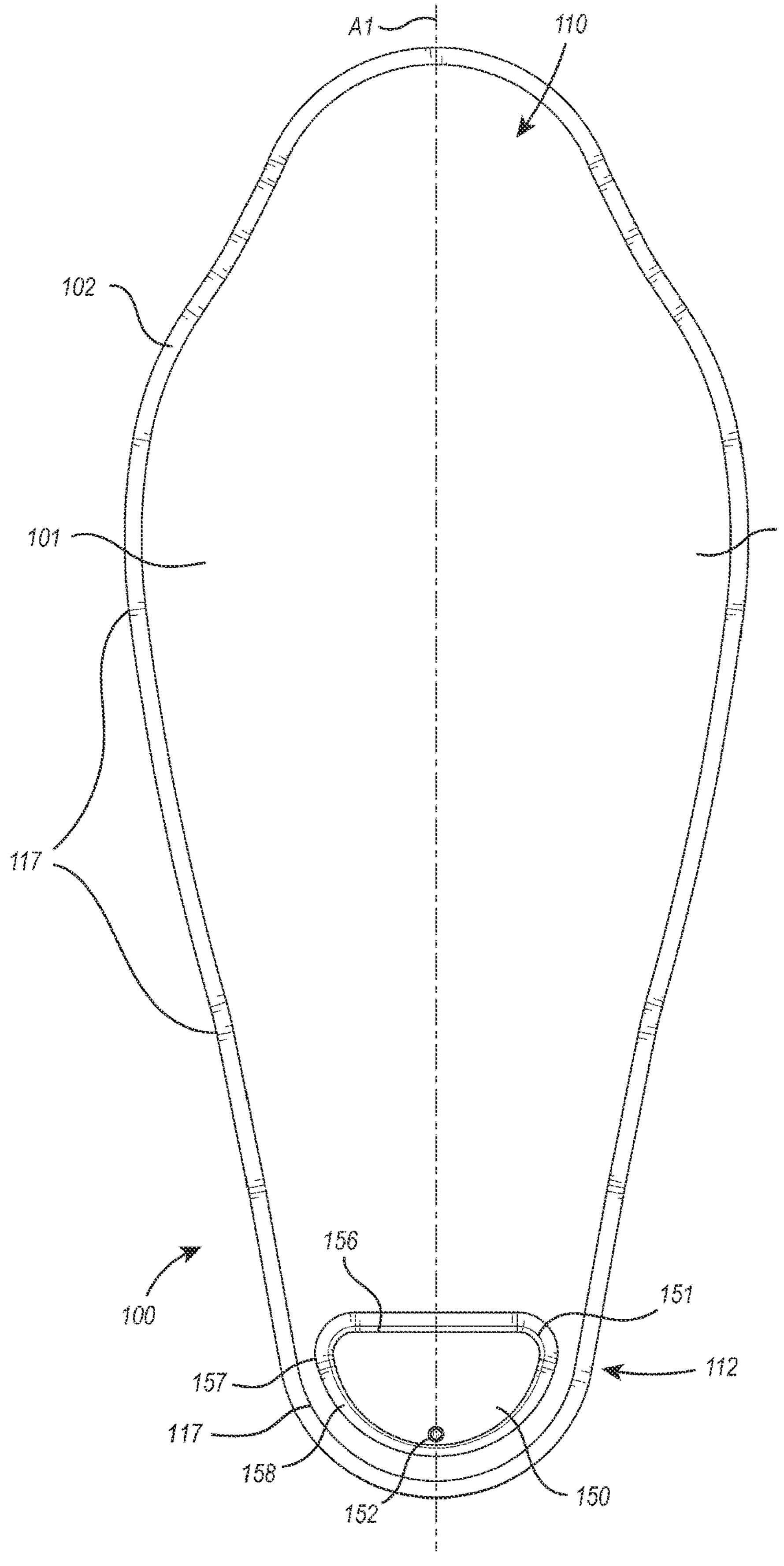
FIG. 4 is a bottom plan view of the shower of the embodiment of FIG. 1B.

FIG. 4 is a plan view of a bottom surface 101 of the shower 100. The bottom surface 101 may be substantially flat as described above. The bottom surface 101 may be defined by a bottom surface 131 of the body portion 130 of the shower 100, which may be coextensive with a bottom surface of the outer wall 102. The bottom surface 131 may extend substantially continuously with the bottom surface of the outer wall 102 to define a flat surface of the shower 100.

Figure 8:
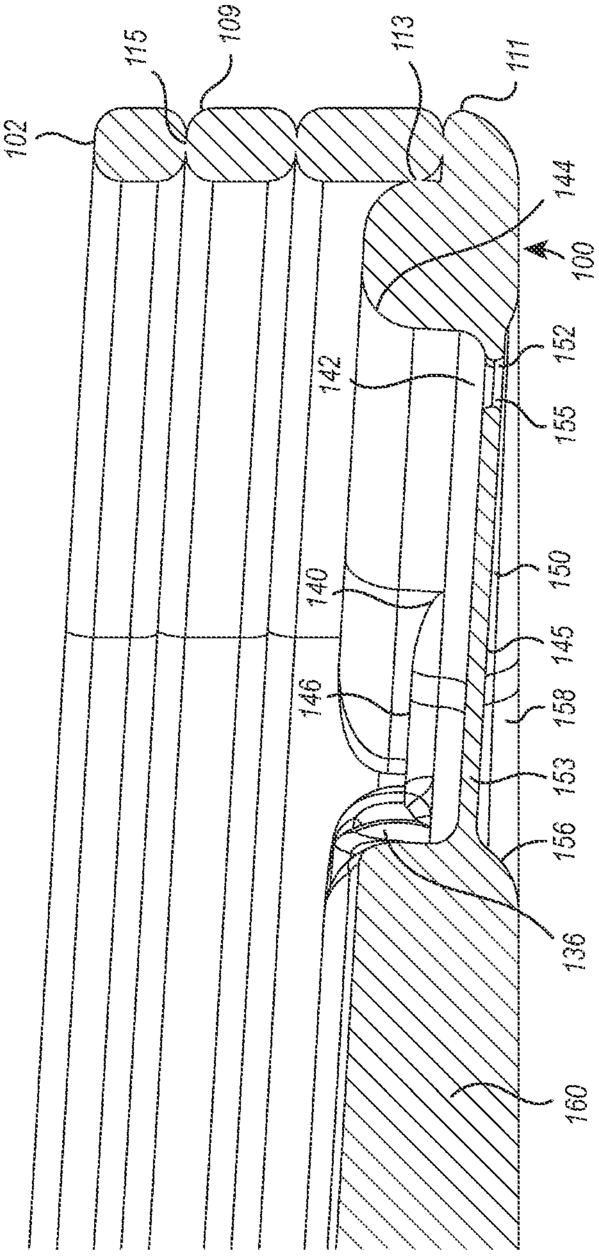
FIG. 8 is a close-up view of the section C8 in FIG. 7.

In embodiments, a bottom surface of the outer wall 102 may be higher or lower than the bottom surface 101 of the shower 100, such that either the bottom surface of the outer wall 102 forms the bottom surface 101 of the shower and the bottom surface 131 is raised above the bottom surface of the outer wall 102, or the bottom surface 131 forms the bottom surface and the outer wall 102 is raised relative to the bottom surface 131. At the bottom end 112 proximate the location of the drain portion 140, a bottom drain section 150 may be defined as a recess 151 into a thickness of the shower 100 and comprising or defining a bottom surface 145 (FIG. 8).

The bottom drain section 150 may further include a bottom drain aperture 152 in communication with the aperture 142 to allow the removal of spent washing fluid after it has contacted the patient. The bottom drain section 150 may include one or more lips at which the bottom surface 101 is resumed, including in the depicted embodiment a transverse recess lip 156 and an arcuate recess lip 158, the transverse and arcuate recess lips 156, 158 connecting to each other to define a substantially semi-circular configuration of the recess 151. The provision of the bottom drain section 150, including the recess 151, may advantageously allow for greater flexibility in the drain portion 140 as the shower 100 is moved to a collapsed configuration and better facilitates drainage of fluid.

The outer wall 102 and the bottom drain section 150 may include one or more junctions 117, 157, respectively. The junctions 117 (FIGS. 3 and 4) may be defined through a thickness of the outer wall 102 and may facilitate the connection or adhesion of discrete sections of material to form the outer wall 102, facilitating a more dynamic manufacturing process and improved economy of material consumption. For example, rather than form the entirety of the outer wall 102 from a single piece of material, discrete sections of the outer wall 102 may be joined together at the junctions 117 to define the outer wall 102. This may also strengthen the outer wall 102 in areas likely to experience increased mechanical stress.

The junctions 157 similarly may allow for the bottom drain section, including the transverse recess lip 156 and the arcuate recess lip 158 to be joined together. Any suitable adhesive or method may be used to join the material of the discrete portions together at the junctions 117, 157, including elastomeric adhesives, heat welding, or otherwise. While the junctions 117, 157 have been shown, it will be appreciated that more or fewer junctions may be applied at any section or portion of the shower 100 as suitable. In embodiments, an entirety of the shower 100 may be formed from a single continuous piece of material without junctions and discrete sections that are adhered to each other.

Figure 5:
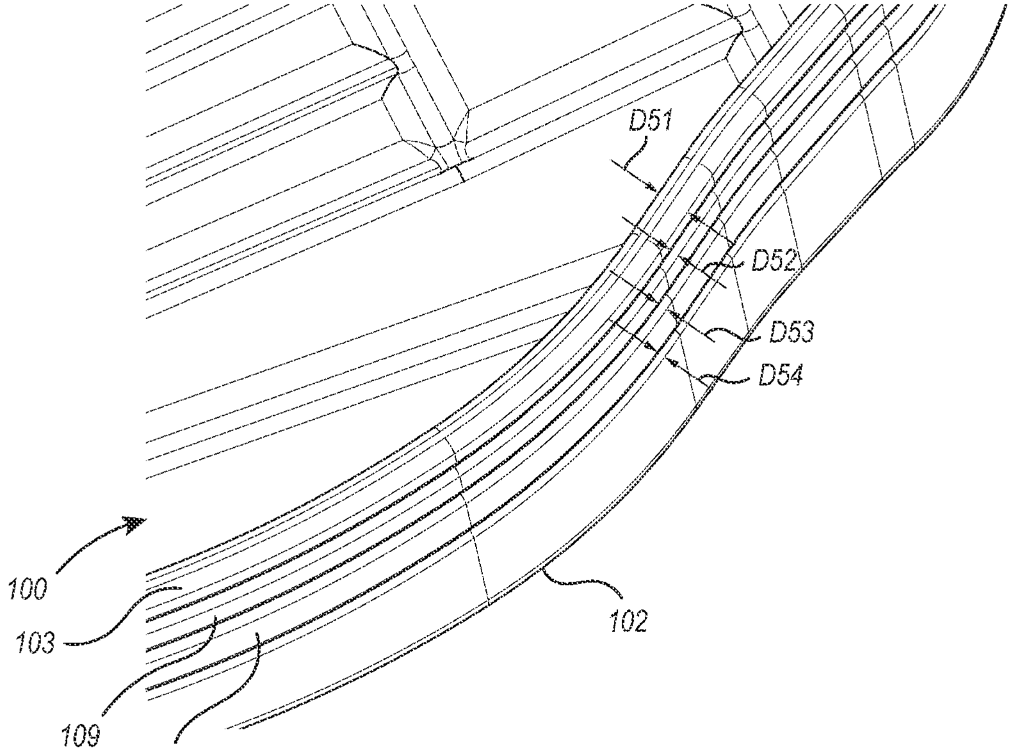
FIG. 5 is a close-up view of the section C5 of FIG. 3.

Turning now to FIGS. 5 and 6, the configuration of the outer wall 102 may be observed in greater detail. The uppermost segment 109 of the outer wall 102 in the area designated C5 in FIG. 3 may have a first width D51. The width D51 of the uppermost segment 109 may be substantially uniform about an entire length of the outer wall 102 or may be greater or smaller in particular areas.

A distance D52, D53, D54 of folds 107 defining the distance between two adjacent segments 109 on the outer wall 102 may be any suitable value, such as 0.5-100 mm. The distances D52, D53, D54 may alternately vary about a length of the outer wall 102. In yet other embodiments, the distances D52, D53, D54 may vary uniformly about the outer wall 102. Likewise, as seen in FIG. 6, distances D62, D63 of the folds 119 between the segments 109 may have any suitable arrangement. In the depicted embodiment, the distances are uniform about the outer wall 102, facilitating a uniform collapsibility of the shower 100. The width D61 of the outer wall 102 likewise may be uniform or may vary.

Figure 7:
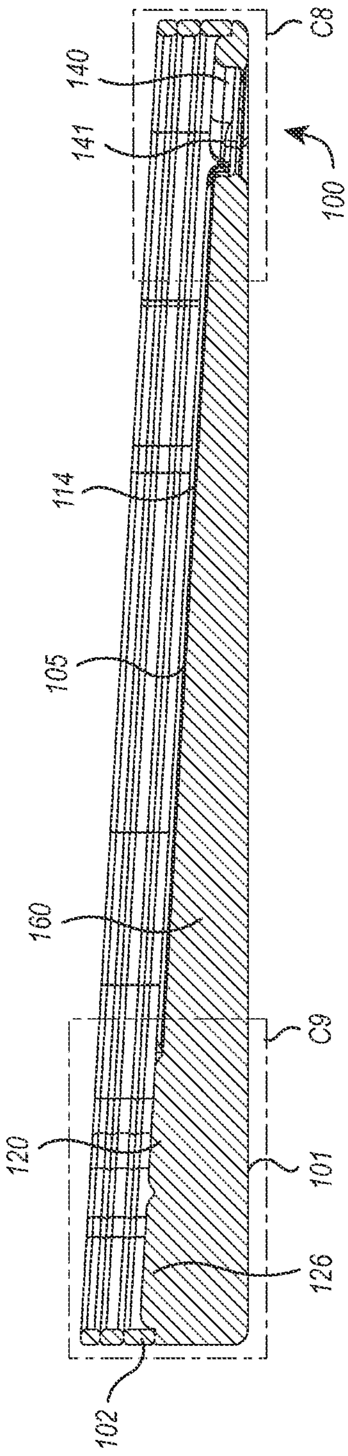
FIG. 7 is an elevational cutaway view taken along the line A1-A1 in FIG. 1B.
Figure 9:
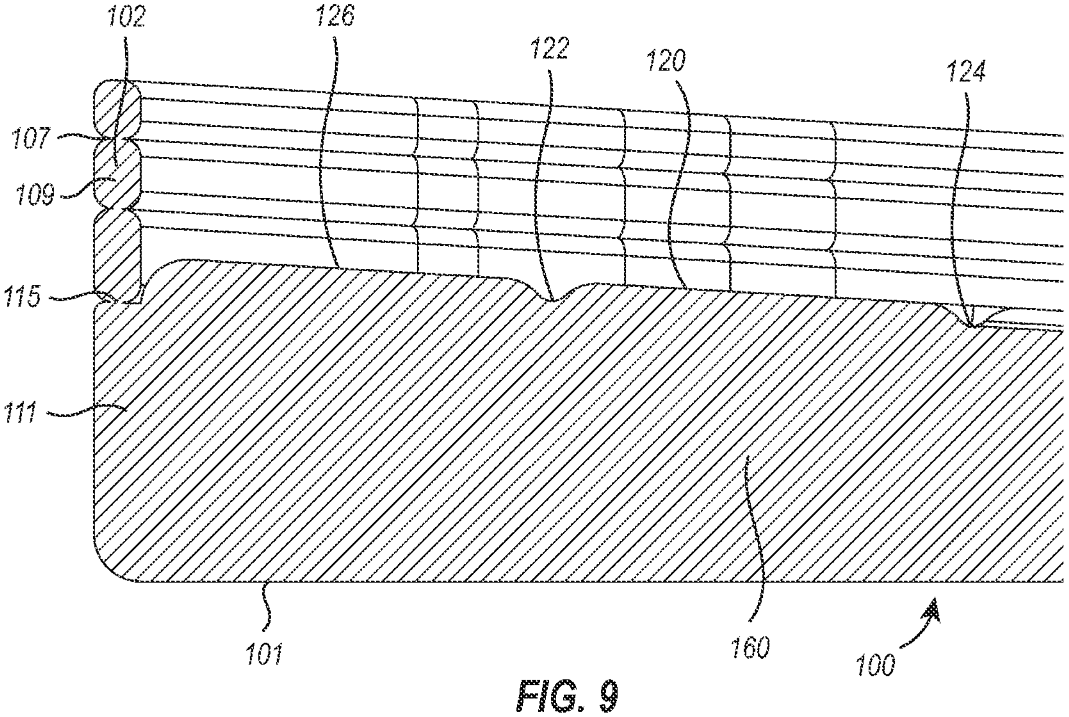
FIG. 9 is a close-up view of the section C9 in FIG. 7.

Turning now to FIGS. 7-9, longitudinal cutaway views of the shower 100 are shown. The shower 100 may define a slope 105 as discussed herein, with a main body chamber 160 defined within a thickness of the main body portion 111 wherein a filling medium may be received. The material defining the shower 100 may have any suitable thickness across the shower 100, such as from 1 mm or less up to 10 mm or more, and may define any suitable properties for the comfort of a patient, effectiveness of washing the patient, and the ability to collapse and/or inflate.

As seen in FIG. 8, the drain portion 140 as shown in C8 may facilitate drainage of the spent washing fluid while maintaining a substantially continuous main body chamber 160 throughout an entirety of the shower 100. For example, the drain portion 140 may include the aperture 142 which may be connected to the bottom drain aperture 152 by a channel 155 through the main body chamber 160 without discretizing the main body chamber 160. The shower 100 may define a channel 153 through the main body chamber 160 such that the main body chamber 160 remains substantially continuous, simplifying use, including inflation and deflation, of the shower 100, as a clinician or caretaker only needs to inflate or deflate a single chamber 160.

The segments 109 of the outer wall 102 may, despite the depth of the folds 107, be fluidly connected to each other and to the main body chamber 160, by means of vertical passageways 115 that connect the segments 109 to each other and to the main body portion 111 and/or the main body chamber 160. Additionally, one or more of the segments 109 may include a lateral passageway 113 connecting to one or more structures of the shower 100 and accordingly to the main body chamber 160.

As seen in FIG. 9, the main body portion 111 may connect fluidly with the segments 109 at the vertical passageways 115 such that a single main body chamber 160 fluidly connects with all inflatable structures within the shower 100. While an entirely or substantially hollow shower 100 structure has been shown, it will be appreciated that other configurations are envisioned. For example, a main body portion 111 of the shower 100 may be formed of a solid thermoplastic elastomer such as a cellular foam material, while one or more of the segments 109 of the outer wall 102 are configured to be collapsible and/or inflatable. Such an embodiment may allow for a degree of inflatability while adding structure features and properties at desired locations.

By providing a main body chamber 160 configured to receive a filling medium such as air or water, a caretaker or clinician may adjust one or more properties of the shower 100. For example, the caretaker or clinician may adjust a pressure of the filling medium within the main body chamber 160 to adjust a stiffness of the shower 100 to a desired stiffness.

While this embodiment has been shown and described, it will be appreciated that any number of discrete chambers may be formed within an interior of the shower 100 by one or more features thereof, such as one or more of the segments 109 of the outer wall 102. In embodiments, this may allow the caretaker or clinician to inflate one segment to a desired stiffness while inflating another segment to a different stiffness suitable for a different location or function. For example, the head portion 120 can be allowed to be more cushioned than other parts of the shower 100.

Figure 10:
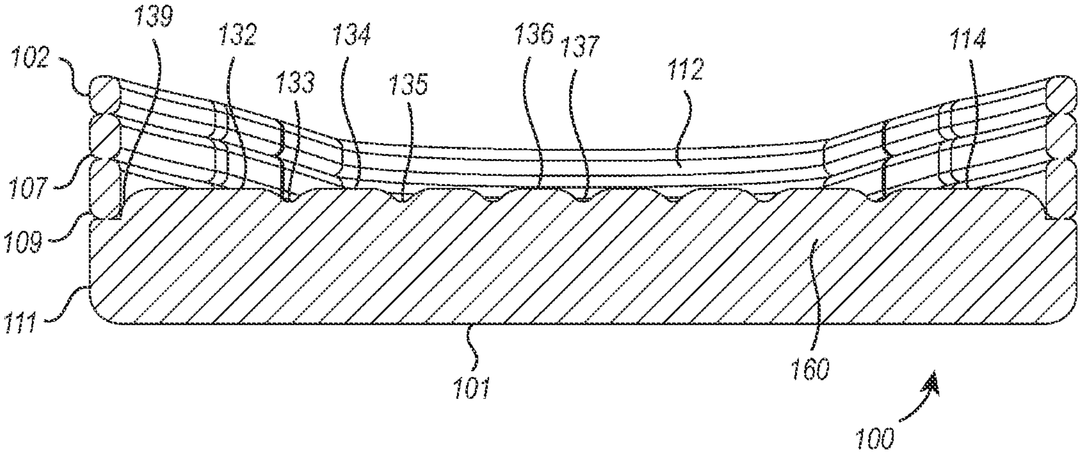
FIG. 10 is an elevational cutaway view taken along the line A10-A10 in FIG. 3.

Similarly, as seen in FIG. 10, the main body chamber 160 of the shower 100 may extend through virtually an entirety of the shower 100, from the upper to the lower ends 110, 112, and from the bottom surface 101 to the top surfaces 114, 103. The segments 132, 134, 136 may likewise be unitary with the material forming the shower 100 and help define the main body chamber 160 without further structural support. This can simplify the manufacturing procedure as well as the operating procedure for the system 10.

While FIG. 10 shows the top surface 114 extend toward the bottom end 112 without a slope from one side to the other (e.g., a slope from the left side toward the right side or from a center toward the sides), it will be understood that the top surface 114 may define any suitable profile or slope. For example, the top surface 114 may extend from a higher left side to a lower right side, from a higher right side to a lower left side, from a higher center of the shower 100 outwardly to both lower right and left sides, from higher right and left sides inwardly to a lower center, or otherwise. Likewise, the slope 105 of the top surface 114 need not be uniform over an entirety of the top surface 114 as shown in FIG. 7, but rather may vary over a length of the shower 100. For example, the slope 105 may steepen closer to the drain portion 140 as suitable.

The segments 132, 134, 136 may include different widths depending on a location about the shower 100. As seen from the cutaway view of FIG. 10, the side segments 132 may have a greater width than the outer body segments 134, which in turn may have a greater width than the central body segments 136. The width of the side segments 132 may increase from the lower end 112 toward the upper end 110, while the width of the outer and central body segments 134, 136 may be unchanged over the longitudinal length of the shower 100. The depicted embodiment is merely exemplary, and more or fewer segments 132, 134, 136 may be provided in any suitable order or configuration and may have a constant or dynamic width about the longitudinal length of the shower 100.

Figure 11:
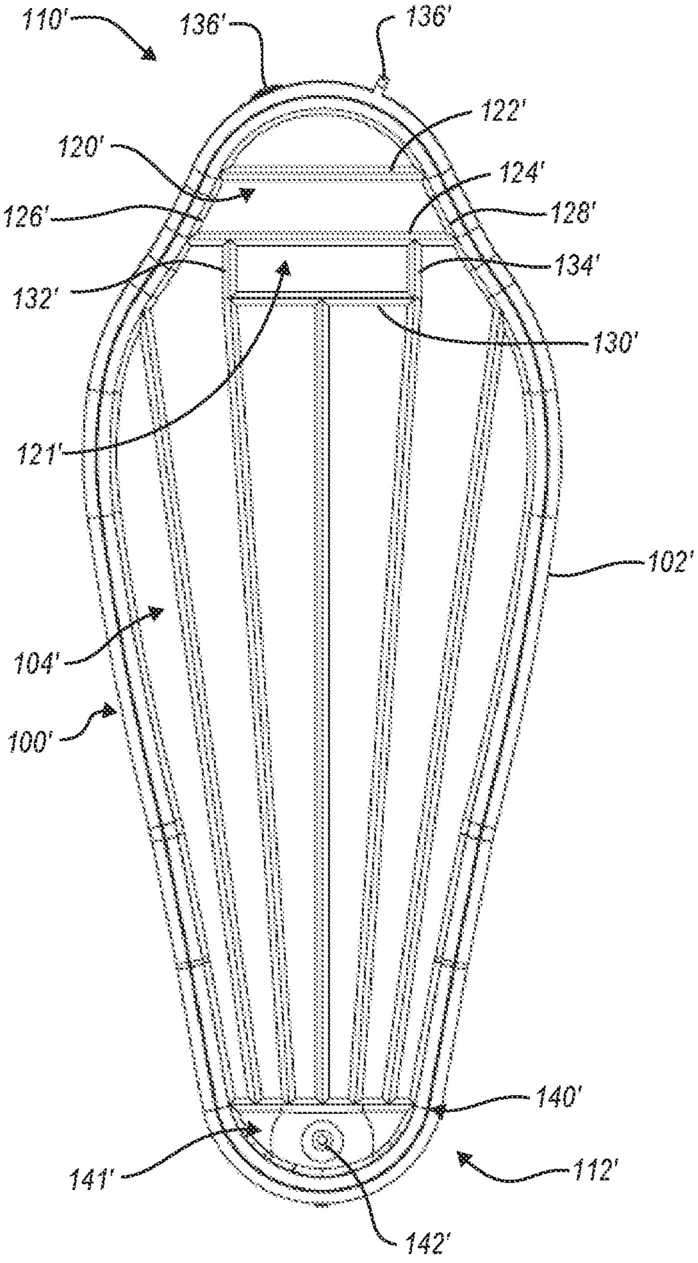
FIG. 11 is a top plan view of another embodiment of a shower for use in the personal hygienic system of FIG. 1A.
Figure 12:
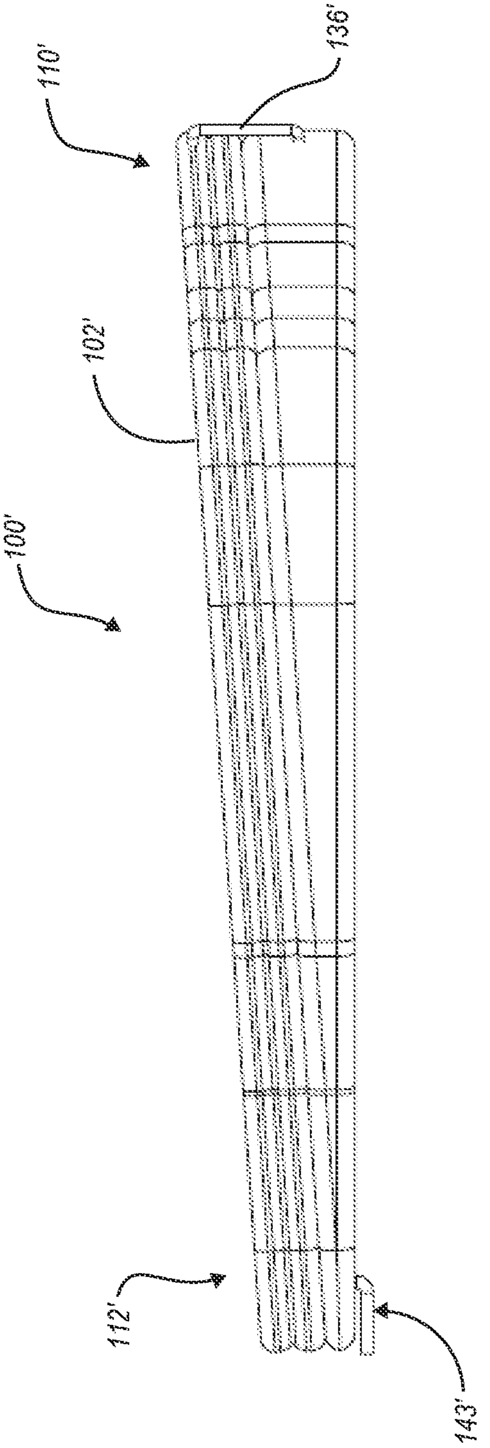
FIG. 12 is an elevational side view of the shower of the embodiment of FIG. 11.
Figure 13:
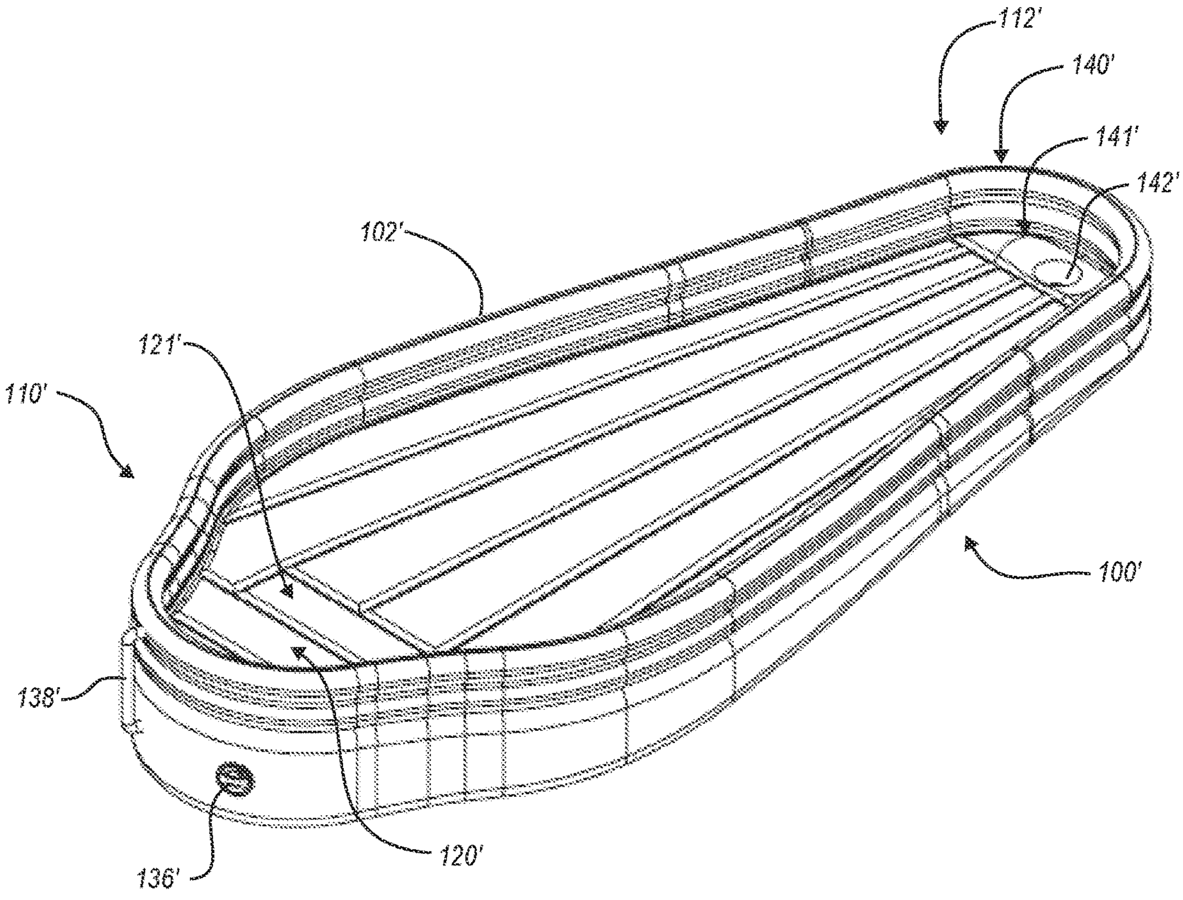
FIG. 13 is a perspective view of the shower of the embodiment of FIG. 11.

Attention is now directed to FIGS. 11-13, which illustrate another example embodiment of a shower 100'. Similar to the shower 100, the shower 100' includes an outer wall 102', an inner space 104', an upper end 110', and a bottom end 112'. Other than some differences between the upper ends 110, 110' and the bottom ends 112, 112', the showers 100, 100' may be similar to identical to one another. Accordingly, the following discussion of the shower 100' will focus on the portions of the upper end 110' and the bottom end 112' that are different from the shower 100.

Similar to the upper end 110 of the shower 100, which includes a head portion 120 defined by transverse and longitudinal folds 122, 124, 135, the upped end 110' of the shower 100' includes a head portion 120'. The head portion 120' is configured to have a patient's head rest thereon while being showered. The head portion 120' is defined by transverse head portion folds 122', 124' and side folds 126', 128'. In the illustrated embodiment, the transverse head portion folds 122', 124' extend between the side folds 126', 128'. Also, according to the illustrated embodiment, the side folds 126', 128' extend along at least a portion of the length of the shower 100' adjacent to the outer wall 102'.

The upper end 110' also includes a neck portion 121'. The neck portion 121' is configured to have a patient's neck rest thereon while being showered. The neck portion 121' is position between the head portion 120' and the bottom end 112' of the shower 100'. The neck portion 121' is defined by transverse folds 124', 130' and side folds 132', 134'. In the illustrated embodiment, the transverse head portion fold 130' extends between the side folds 132', 134', but may alternatively extend between the side folds 126', 128'. Also, according to the illustrated embodiment, the side folds 132', 134' extend along a portion of the length of the shower 100' to a drain portion 140' at the bottom end 112'.

While the portions 120', 121' have been referred to as head and neck portions, this is merely exemplary. Either the head portion 120' or the neck portion 121' may be configured to have a patient's head rest thereon while being showered.

In the illustrated embodiment, the upper end 110' also include a valve 136' that is configured for introducing or releasing a fluid from an interior chamber of the shower 100'. In some embodiments, the valve 136' may be a Halkey-Roberts valve. The upper end 110' also includes an inflation tube 138'. While the present embodiment includes the valve 136' and the inflation tube 138' at the upper end 110' of the shower 100', the valve 136' and/or the inflation tube 138' may be disposed at different locations on the shower 100'.

As noted, the bottom end 112' includes a drain portion 140'. The drain portion 140' includes a recess 141', an aperture 142', and a drain tube 143'. In the illustrated embodiment, the aperture 142' extends through a bottom surface of the recess 141' and is in fluid communication with the drain tube 143'. As a result, fluids that flow into the recess 141' can drain through the aperture 142' and into the drain tube 143'. The drain tube may be connected or otherwise associated with a plumbing unit, such as a spent water or sewage line, in a hospital, care facility, or home, or a waste reservoir.

In the illustrated embodiment, the aperture 142' is disposed approximately in the center of the bottom surface of the recess 141'. In other embodiments, the aperture 142' may be disposed in other portions of the bottom surface of the recess 141'.

Figure 14:
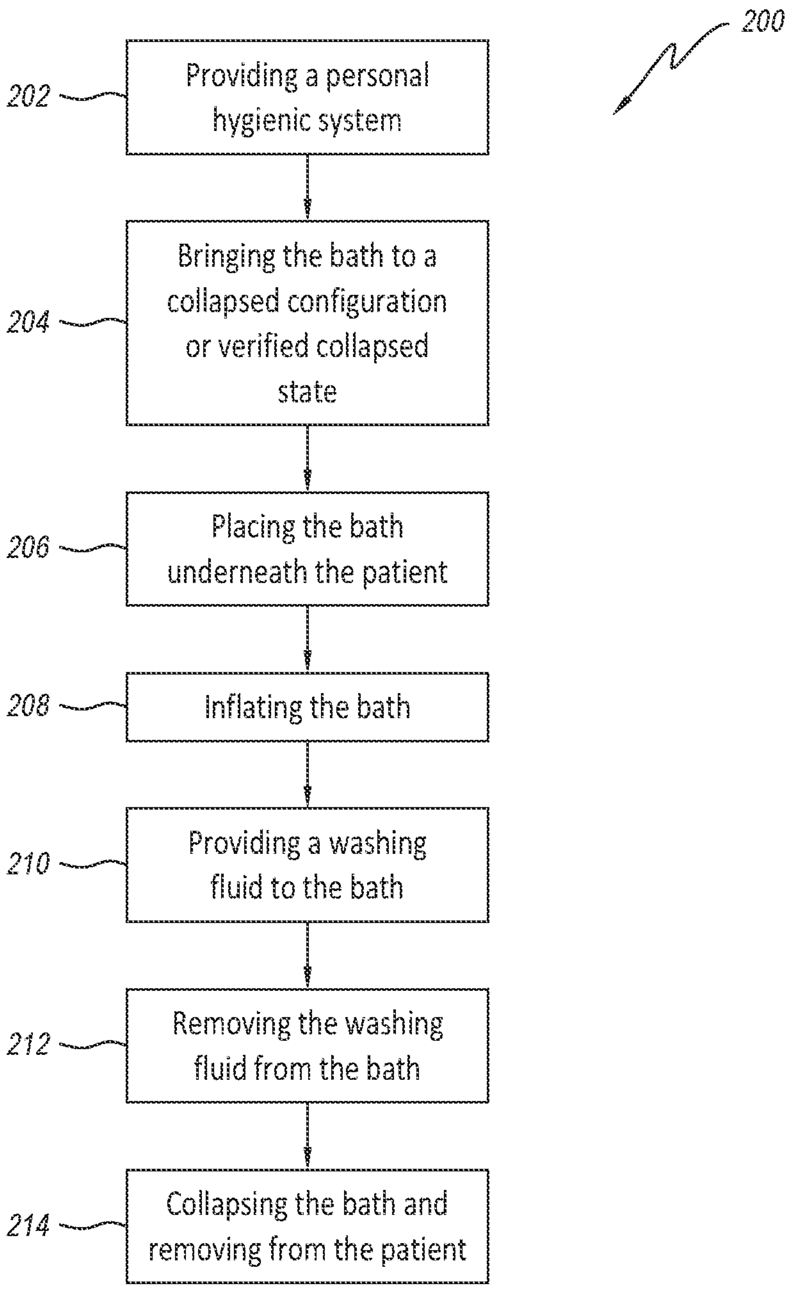
FIG. 14 is a flowchart of a method according to an embodiment of the disclosure.
Figure 15:
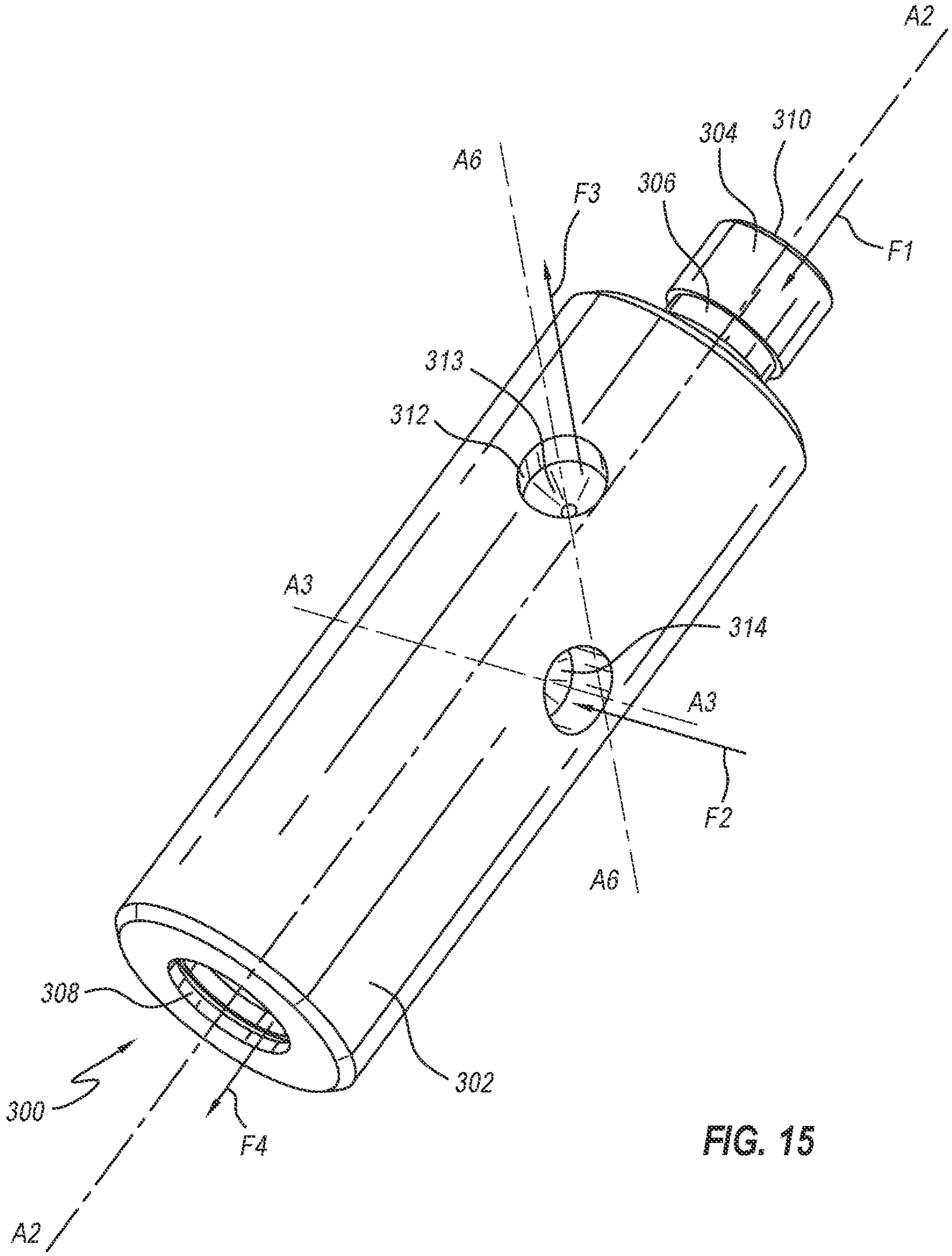
FIG. 15 is a perspective view of a valve body of a valve for use in a personal hygienic system according to an embodiment of the disclosure.

An exemplary method 200 of using personal hygienic systems and components thereof according to embodiments of the disclosure is illustrated in FIG. 14. Method 200 includes one or more of the following steps, not necessarily in the order in which the steps are described. The method 200 includes providing a personal hygienic system (act 202). The method 200 also includes bringing the shower to a collapsed configuration by opening a valve—whereat the filling medium is provided—causing the shower to deflate (act 204). Alternatively, act 204 may include a caretaker or clinician verifying that the shower is already in a collapsed configuration. The method 200 further includes placing or sliding the shower underneath a patient while in the collapsed configuration (act 206).

For example, the shower 100 may be slid from one side of the patient toward the other side, or the shower 100 may be slid from the top of the patient downward as the patient is lying in bed or any other suitable location. The folds may serve as indicia to help the caretaker or clinician properly locate the shower 100 relative to the patient; for example, the folds 122, 124, 135 that circumscribe the head portion 120 may be relied upon to position the head portion 120 under the patient's head, with the remainder of the shower 100 being placed accordingly.

The method 200 further includes, after positioning the shower 100, inflating the shower 100 with a filling medium by any suitable means, such as a pressure-altering device including a compressor for gases or a pump for liquids (act 208). In embodiments, one or more of the folds and/or segments of the shower 100 may include one or more indicia that indicate when the shower 100 has been sufficiently inflated.

The method 200 further includes providing a washing fluid the shower 100 (act 210). The washing fluid may be drawn from a reservoir 50 or from a plumbing outlet, such as a sink through a hose. The washing fluid may be passed through a valve 80, such as a venturi valve, which can be controlled independently of or along with the pressure-altering means 75, to control the pressure and/or flowrate of the washing fluid. The washing fluid may be dispensed through any suitable dispensing modality, such as a hose, faucet, or showerhead to wash the patient within the inner space 104 of the shower 100.

The method 200 further includes removing the washing fluid from the drain portion 140 of the shower 100 through the aperture 142 (act 212). The spent washing fluid may be removed using any suitable means, including passive draining, or may be removed by providing suction proximate the aperture 142. The spent washing fluid may be removed through a waste line 95. The waste line 95 may dispose of the spent washing fluid to a plumbing fixture such as a sink or drain, to a waste reservoir, or at least part of the waste line 95 contents may be recycled to the shower 100.

In an embodiment, the washing fluid may be removed using suction provided by the pressure-altering means 75 using the valve 80 which is a venturi valve configured to both provide positive pressure to the washing fluid provided to the shower 100 and to provide suction for the spent washing fluid from the aperture 142 as washing fluid passes through the venturi valve under positive pressure, such as from the pressure-altering means. The step 212 of removing the washing fluid may continue after washing fluid is no longer being provided to the shower 100 so as to ensure that all or substantially all washing fluid has been drained.

The method optionally includes collapsing the shower 100 to the collapsed configuration by releasing or opening the valve whereat the filling medium is provided and removing the collapsed shower 100 from under the patient. The collapsed configuration may facilitate easier removal of the shower 100 from about the patient. Alternatively, the shower 100 may be removed from about the patient in the inflated configuration.

Turning to FIGS. 15-21, a valve for use in a personal hygienic system according to an embodiment is shown and described. The valve may be a venturi valve configured to simultaneously provide positive pressure through a shower nozzle for showering a patient and suction to remove water from the shower through the drain. The valve may comprise an outer body 300 extending about a longitudinal axis A2-A2. The outer body 300 comprises a main body portion 302 that defines a cylindrical shape. The outer body 300 defines a lower opening 308 in the main body portion 302 and an upper opening 310, the upper opening 310 defined through an extension portion 304 proximate the main body portion 302. A washing fluid such as water flows from a source in a direction F1 through the upper opening 310. Spent washing fluid being suctioned from the shower is withdrawn by suction in a direction F2 through a side opening 314 defined through a thickness of the outer body 300, which is proximate a center portion of the valve. The side opening 314 and the direction F2 may extend or be defined along an axis A3-A3, which may be transverse to, offset from, or parallel to the axis A2-A2, or arranged in any other suitable manner.

Washing fluid is provided to the shower under pressure in a direction F3 through a second side opening 312, which is defined through a thickness of the outer body 300. The opening 312 includes a tapered portion 313. The direction F3 and the side opening 312 may extend or be defined along an axis A6-A6, which may be transverse to the axis A2-A2 and the axis A3-A3. In embodiments, the axis A6-A6 may be transverse to one or both of the axes A2-A2, A3-A3, offset from one or both of the axes A2-A2, A3-A3, parallel to one or both of the axes A2-A2, A3-A3, or arranged in any other suitable manner. Spent washing fluid exits the valve in a direction F4 through the lower opening 308. The direction F4 and the lower opening 308 may be aligned along the axis A2-A2, or may extend in any other suitable direction.

The extension portion 304 has a smaller diameter than a diameter of a main body portion 302, and further defines a recess 306 between the main body portion 302 and the extension portion 304. The recess 306 is configured to facilitate a releasable attachment between the valve and a water source, such as a faucet. In embodiments, the recess 306 defines threadings or other attachment components for attaching to a faucet.

Figure 16:
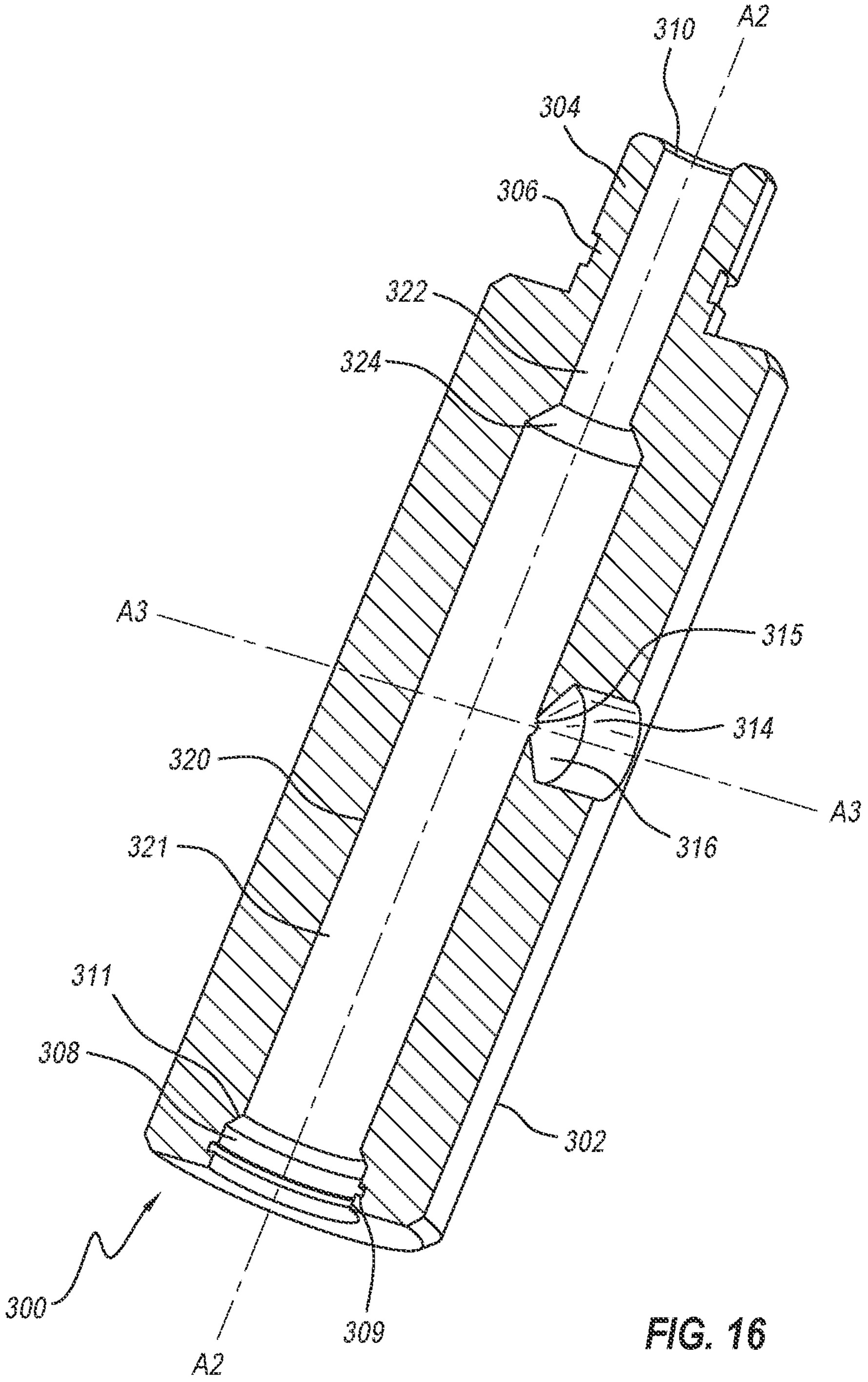
FIG. 16 is a cutaway view of the valve body of FIG. 15 taken along the line A2-A2.

Turning to FIG. 16, the outer body 300 includes or defines an inner space 320 through which the washing fluid flows. The inner space 320 may be uniform along a length of the outer body 300 or may define a first section 321, corresponding to the main body portion 302, and a second section 322 corresponding to the extension portion 304. A tapered portion 324 connects the first and second sections 321, 322. The side opening 314 defines a tapered portion 316 leading to an aperture 315 which connects to the inner space 320. Not shown is an aperture connecting the inner space 321 to the side opening 312. The inner space 320 defines a tapered section 311 between the first section 321 and the lower opening 308, in which a recess 309 is defined and configured to receiving a retaining ring.

Figure 17:
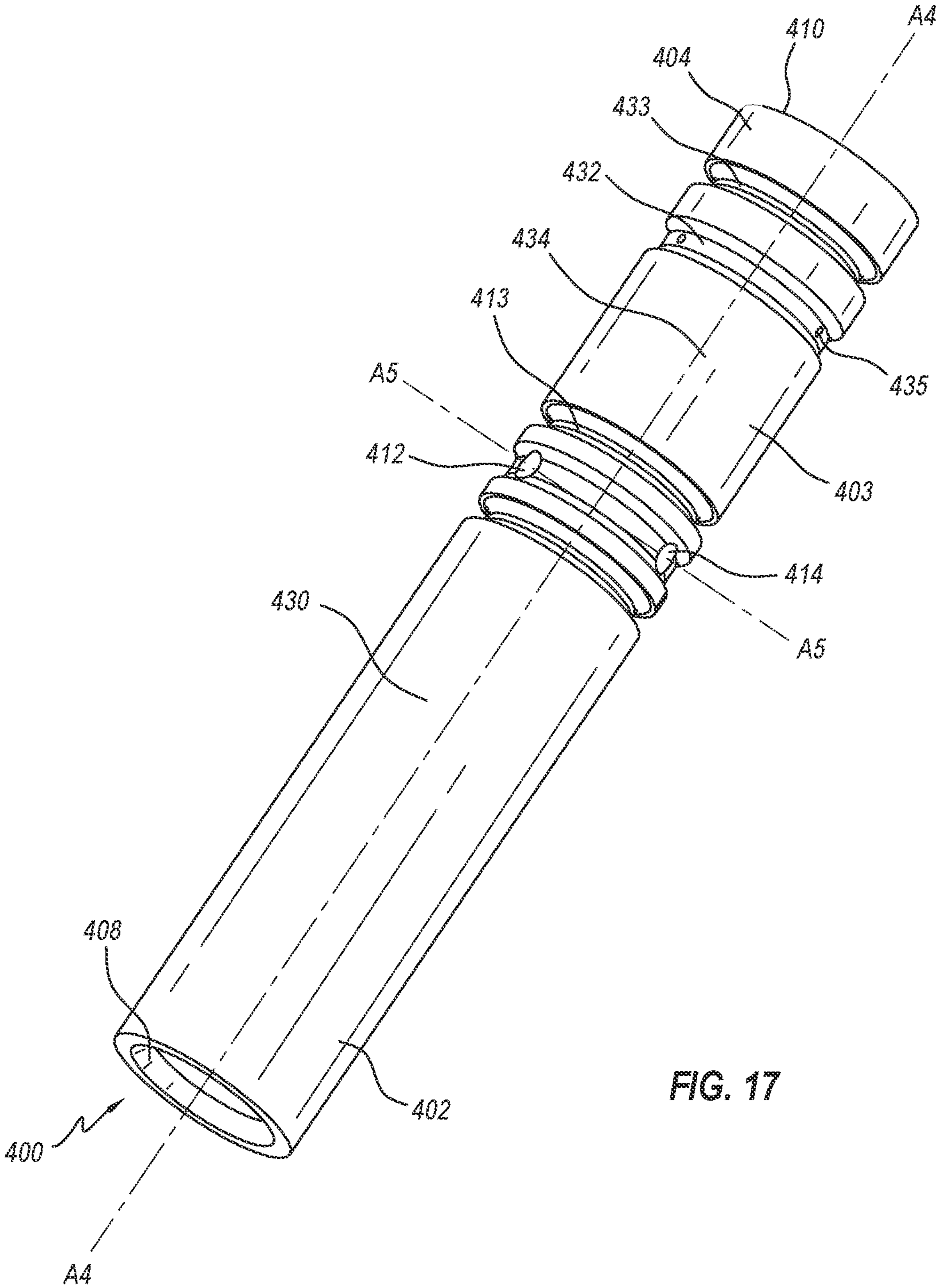
FIG. 17 is a perspective view of a center component a valve according to the embodiment of FIG. 15.

The inner space 320 is configured to receive an inner component 400 shown in FIG. 17. The inner component 400 extends along a longitudinal axis A4-A4 which may correspond to or align with the longitudinal axis A2-A2. The inner component 400 defines lower and upper openings 408, 410 corresponding to and/or cooperating with the upper and lower openings 308, 310 of the outer body 300, and defines apertures 414, 435 configured to correspond to the side openings 312, 314. The aperture 414 may extend along an axis A5-A5, which may correspond to, be aligned with, be offset from, or otherwise relate to the axis A3-A3. The inner component 400 defines a cylindrical shape corresponding to a shape of the inner space 320 and defines one or more recesses 412, 413, 432, 433, 436. In embodiments, the recesses 412, 413, 432, 433 may be configured to cooperate with one or more O-rings 760 or other suitable components.

Figure 18:
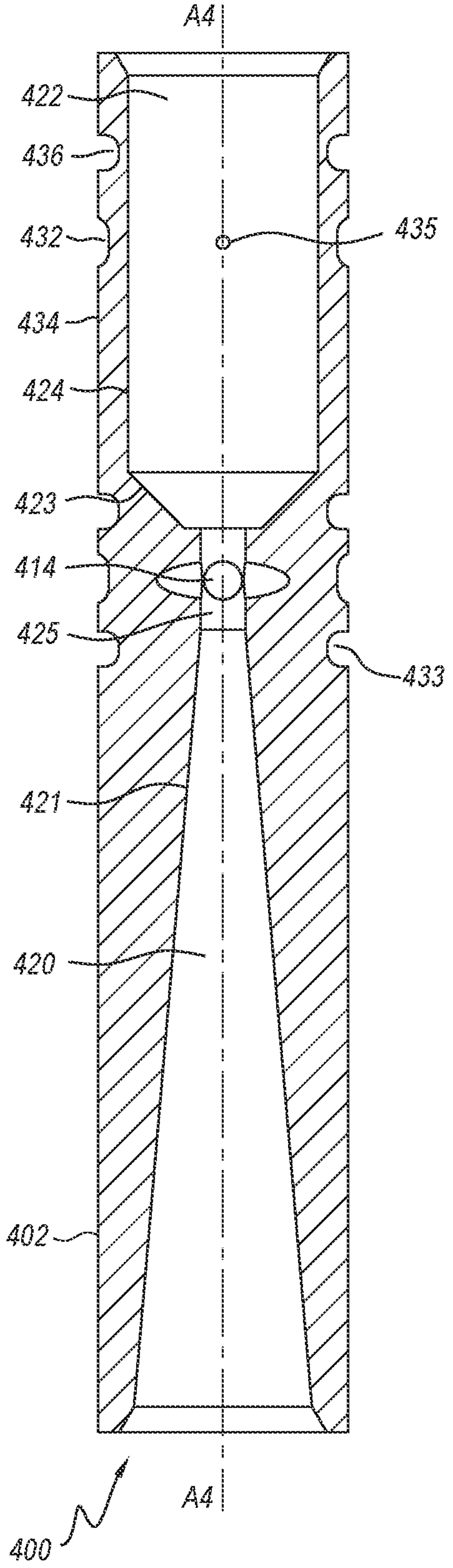
FIG. 18 is a cutaway view of the center component of FIG. 17 taken along the line A4-A4.

Turning to FIG. 18, the inner component 400 is shown in cutaway elevational view. The inner component 400 defines one or more inner spaces 420, 422, cooperating to define a continuous or substantially continuous passage between the lower and upper openings 408, 410. The inner spaces 420, 422 are connected by a narrowed space 425 proximate the aperture 414. The inner space 420 defines a profile 421 as it narrows to the passage 425, and the inner space 422 defines a profile 423 as it narrows to the passage 425.

In the depicted embodiment, the profile 421 defines a smaller angle relative to the longitudinal axis A4-A4 than the profile 423. For example, the profile 423 extends from a straight portion 424 which extends a distance from the upper opening 410 toward the narrowed space 425, whereas the profile 421 may extend substantially continuously from the lower opening 408. This advantageously generates a pressure drop as the washing fluid flows in the direction F1 through the inner space 422 toward the inner space 420, as the diameter suddenly narrows at the profile 423 and gradually expands outward at the profile 421. The resulting pressure drop, taking effect proximate the narrowed portion 425 due to the necessarily increased velocity of the washing fluid flowing through the narrowed portion 425, and the vacuum generated as the washing fluid expands along the profile 421, provides suction that draws spent washing fluid through the aperture 414.

Figure 19:
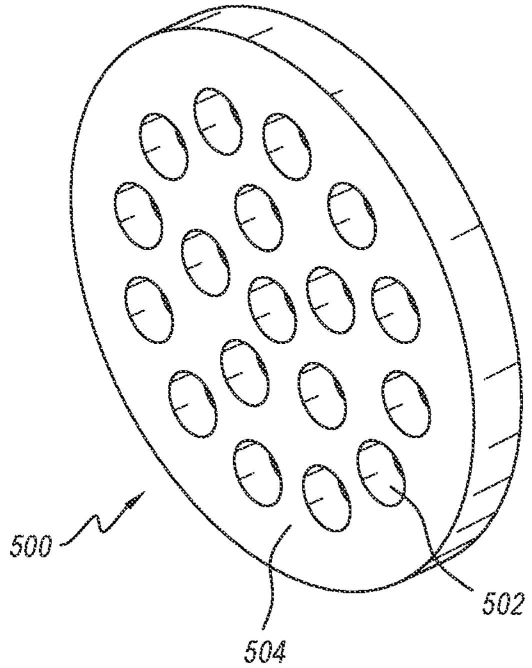
FIG. 19 is a perspective view of a filter for use in a valve according to the embodiment of FIG. 15.

Turning to FIG. 19, a filter 500 configured to cooperate with the inner component 400 and the outer body 300 is shown in perspective view. The filter 500 comprises a plate 504 through at least a part of a thickness of which a plurality of apertures 502 are defined. The filter 500 is configured in size and shape to be arranged proximate the lower opening 408 of the inner component 400. The filter 500 prevents the passage of impurities through the valve, the degree of filtration corresponding to a size of the apertures 502.

Figure 20:
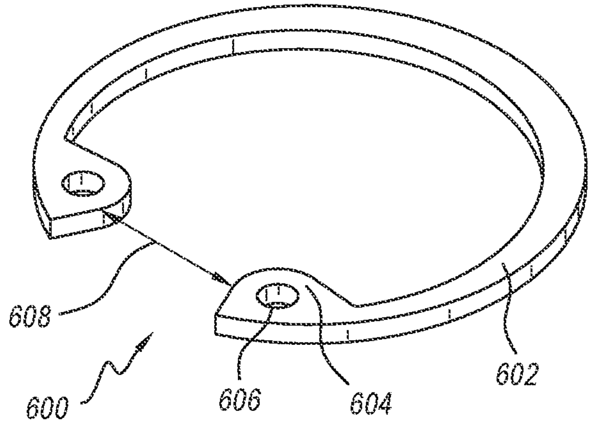
FIG. 20 is a perspective view of a retaining ring for use in a valve according to the embodiment of FIG. 15.

FIG. 20 shows an internal retaining ring 600 configured likewise for use with the valve. The internal retaining ring 600 is configured to be received within the recess 309 of the outer body 300 and serves to retain the filter 500 in position relative to the outer body 300 and the inner component 400. The internal retaining ring 600 advantageously defines a body 602 corresponding to the shape of the recess 309, the filter 500, and/or the inner component 400. The internal retaining ring 600 further defines attachment components 604 defining apertures 606 through which one or more suitable fasteners are received to secure the internal retaining ring 600 to the valve. The retaining ring 600 extends substantially circumferentially about the internal component 400 and defines a distance 608 between the attachment components 604.

Figure 21:
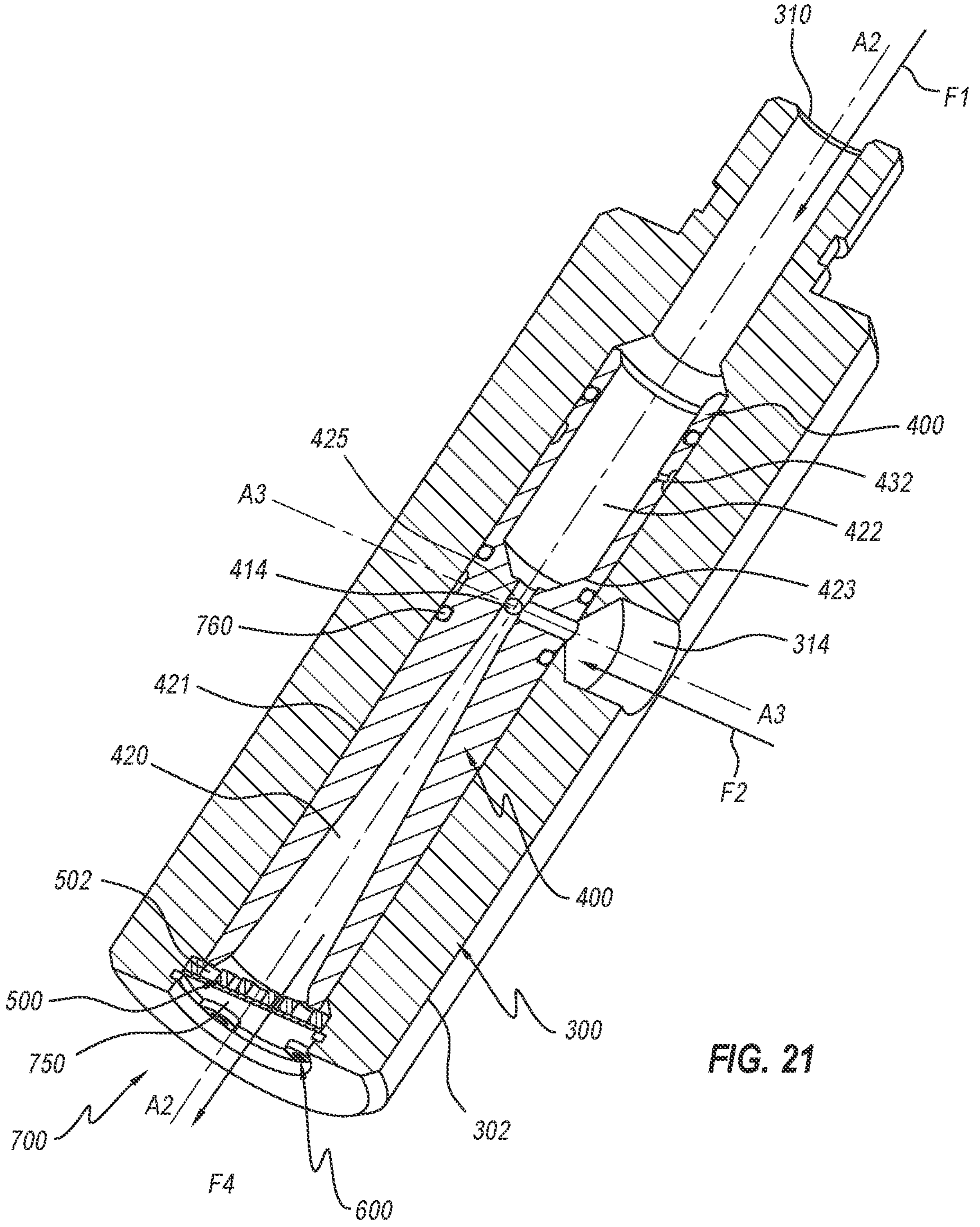
FIG. 21 is a perspective view of an assembled valve according to the embodiment of FIG. 15.

FIG. 21 shows the outer body 300, the internal component 400, the filter 500, and the internal retaining ring 600 cooperating to define the valve. The valve may comprise an additional filter 750 arranged proximate the filter 500. The filter 750 may be a mesh filter, for example, configured to capture smaller particulates than the filter 500. By providing the inner component 400 defining the inner spaces 421, 422 as shown, the flow F1 simultaneously provides positive pressure for the flow F3 of washing fluid to the shower and suction for the flow F2 of spent washing fluid from the shower, as the configuration of the inner spaces 421, 422, and the narrowed portion 425 generates an increased velocity of the washing fluid provided at F1 generating a pressure reduction and corresponding suction proximate the aperture 314. This allows the valve to provide positive washing fluid pressure, suction for the spent washing fluid, and to prevent backflow, all while attaching by the extension portion 304 to, for example, a faucet or other existing water source.

By providing a personal hygienic system and method for using the same according to disclosed embodiments, the problem of existing hygienic systems being necessarily integrated with a hospital bed, poorly adapted to being collapsible and/or inflatable as well as properly draining water, and/or being difficult to place under a patient. The disclosed embodiments advantageously provide a shower configured to be collapsed and/or inflated as necessary so as to be placed under a patient and to be portable, with an improved drain portion that facilitates effective removal of washing fluid, and a configuration of segments and folds that both facilitates effective draining of washing fluid toward the drain portion and effective collapsing and inflating of the shower.

Not necessarily all such objects or advantages may be achieved under any embodiment of the disclosure. Those skilled in the art will recognize that the disclosure may be embodied or carried out to achieve or optimize one advantage or group of advantages as taught without achieving other objects or advantages as taught or suggested.

The skilled artisan will recognize the interchangeability of various components from different embodiments described. Besides the variations described, other known equivalents for each feature can be mixed and matched by one of ordinary skill in this art to construct or use a personal hygienic system under principles of the present disclosure. Therefore, the embodiments described may be adapted to washing or cleaning systems in general, including systems, components, and methods for cleaning persons, animals, or objects, or for other devices involving a basin of fluid.

Although the personal hygienic system has been disclosed in certain preferred embodiments and examples, it therefore will be understood by those skilled in the art that the present disclosure extends beyond the disclosed embodiments to other alternative embodiments and/or uses of the personal hygienic system and method for using the same and obvious modifications and equivalents. It is intended that the scope of the present personal hygienic system disclosed should not be limited by the disclosed embodiments described above, but should be determined only by a fair reading of the claims that follow.

What is claimed is:

1. A personal hygienic system configured to be portable and to be placed under a patient on a bed or reclined surface, the personal hygienic system comprising:

an inflatable shower extending longitudinally along an axis from an upper end to a bottom end and comprising an outer wall defining an inner space and configured to surround a patient and to receive at least one washing fluid;

the outer wall comprising at least two folds discretizing at least two wall segments arranged substantially vertically, the at least two folds and the at least two wall segments extending substantially longitudinally from the upper end to the bottom end;

the inner space defines a slope declining from the upper end toward the bottom end, a drain portion arranged proximate the bottom end and defining a recess, an aperture located in the recess and defined through a thickness of the inflatable shower, a raised bottom lip disposed at least partially between the recess and the outer wall at the bottom end, the raised bottom lip at least partially bounding the recess, and at least one drain channel arranged on a side of the drain portion and configured to collect spent washing fluid from one or more side segments and corresponding folds of the inner space;

the outer wall defines a profile between the upper and bottom ends and defining a widest point therebetween;

the inflatable shower comprises a textile-reinforced polymeric wall material defining an inner cavity sealed by a filling valve and configured to receive a filling medium comprising at least one fluid;

at least one pump configured to provide the washing fluid to the inflatable shower under a positive pressure; and a venturi valve configured to deliver the washing fluid to the inflatable shower therethrough while simultaneously providing suction to remove the spent washing fluid from the shower therethrough.

2. The personal hygienic system of claim 1, wherein a bottom surface of the inflatable shower is substantially flat and defines a bottom drain recess extending upwardly from the bottom surface, the recess bounded by one or more lips.

3. The personal hygienic system of claim 2, wherein the one or more lips of the bottom drain recess comprise a transverse recess lip and an arcuate recess lip, the transverse and arcuate recess lips connecting to each other to define a substantially semi-circular configuration.

4. The personal hygienic system of claim 1, wherein one or more body segments comprise a head and/or neck portion defined by top and bottom transverse folds and one or more longitudinal folds configured to facilitate drainage of fluid away from a patient's head and/or neck.

5. The personal hygienic system of claim 1, wherein the at least two wall segments are in fluid communication with each other and with the inner cavity at one or more passageways.

6. The personal hygienic system of claim 1, wherein a top surface of the inner space is defined by one or more body segments discretized by one or more longitudinal folds extending a predetermined depth into the top surface.

7. The personal hygienic system of claim 6, wherein the one or more longitudinal folds extend directly to the drain portion of the inflatable shower and are configured to facilitate a flow of the spent washing fluid to the drain portion.

8. The personal hygienic system of claim 6, wherein one or more central body segments of the one or more body segments extends substantially parallel with the axis and wherein one or more side body segments of the one or more body segments located outwardly from the central body segments extends along a second axis offset by an angle from the axis.

9. The personal hygienic system of claim 1, wherein a topmost wall segment of the outer wall extends substantially parallel with the slope and defines a flat surface along the slope.

10. The personal hygienic system of claim 1, wherein the raised bottom lip of the drain portion is substantially arcuate and corresponds to the bottom end, which defines an arcuate configuration.

11. The personal hygienic system of claim 10, wherein one or more body segments defining a top surface of the inner space define a substantially transverse proximal edge of the drain portion.

12. The personal hygienic system of claim 1, wherein the at least one drain channel extends below a top surface of the inner space and above a bottom surface of the recess of the drain portion.

13. The personal hygienic system of claim 1, wherein the at least one drain channel comprises at least one widened portion adjacent to at least one neck portion, the at least one widened portion and the at least one neck portion defined in part by the bottom lip.

14. The personal hygienic system of claim 1, wherein a height of the bottom lip is substantially aligned with the slope.

15. A portable and inflatable shower configured for showering a human, the portable and inflatable shower extending longitudinally along an axis from an upper end to a bottom end and comprising an outer wall defining an inner space and configured to surround a patient and to receive at least one washing fluid, the outer wall defining a profile between the upper and bottom ends and defining a widest point therebetween, the portable and inflatable shower comprising:

a textile-reinforced polymeric wall material defining an inner cavity sealed by a filling valve and configured to receive a filling medium comprising at least one fluid;

at least two folds discretizing at least two wall segments of the outer wall, the at least two wall segments arranged substantially vertically, the at least two folds and the at least two wall segments extending substantially longitudinally from the upper end to the bottom end;

a slope defined within the inner space and declining from the upper end toward the bottom end, a top surface of the inner space having one or more body segments discretized by one or more longitudinal folds extending a predetermined depth into the top surface, the one or more longitudinal folds being configured to direct the washing fluid towards the bottom end;

a drain portion arranged proximate the bottom end and defining a recess;

an aperture located in the recess and defined through a thickness of the inflatable shower;

a raised bottom lip disposed at least partially between the recess and the outer wall at the bottom end, the raised bottom lip at least partially bounding the recess proximate the bottom end;

at least one drain channel arranged on a side of the drain portion and configured to collect spent washing fluid from one or more side segments and corresponding folds of the inner space, the at least one drain channel comprises at least one widened portion adjacent to at least one neck portion, the at least one widened portion and the at least one neck portion defined in part by the bottom lip; and a venturi valve configured to deliver the washing fluid to the inflatable shower therethrough while simultaneously providing suction to remove the spent washing fluid from the shower therethrough.

16. The portable and inflatable shower of claim 15, wherein the wall material is substantially continuous about an entirety of the portable and inflatable shower.

17. The portable and inflatable shower of claim 15, wherein the wall material is a thermoplastic urethane-coated nylon twill material.

18. A method for showering a patient, the method comprising:

providing a personal hygienic system configured to be portable and to be placed under a patient on a bed or reclined surface, the personal hygienic system comprising:

a portable and inflatable shower comprising a textile-reinforced polymeric wall material defining an inner cavity sealed by a filling valve and configured to receive a filling medium comprising at least one fluid, at least two folds discretizing at least two wall segments of an outer wall, the at least two wall segments arranged substantially vertically, the at least two folds and the at least two wall segments extending substantially longitudinally from an upper end to a bottom end, a slope defined within an inner space and declining from the upper end toward the bottom end, a top surface of the inner space having one or more body segments discretized by one or more longitudinal folds extending a predetermined depth into the top surface, the one or more longitudinal folds being configured to direct the washing fluid towards the bottom end, one or more body segments comprising a head and/or neck portion, the head and/or neck portion having an upper surface that is generally coplanar with an upper surface of the slope, the head and/or neck surface being defined by top and bottom transverse folds and one or more longitudinal folds configured to facilitate drainage of fluid away from a patient's head and/or neck, and a drain portion arranged proximate the bottom end and defining a recess;

bringing the portable and inflatable shower to a collapsed configuration or verifying that the portable and inflatable shower is in a collapsed state;

placing the portable and inflatable shower underneath the patient;

inflating the portable and inflatable shower using a pressure-altering mechanism in fluid communication with the filling valve;

providing a washing fluid to the inner space of the portable and inflatable shower to wash the patient; and removing spent washing fluid from the portable and inflatable shower using the drain portion and a washing fluid valve, the washing fluid valve being a venturi valve configured to provide washing fluid while simultaneously providing suction for removing the spent washing fluid using a positive pressure of the washing fluid.

19. The method of claim 18, further comprising collapsing the shower to the collapsed configuration by releasing or opening the filling valve, and removing the collapsed shower.

* * * * *